US012657381B2

(12) United States Patent
Kirk

(10) Patent No.: US 12,657,381 B2
(45) Date of Patent: Jun. 16, 2026

(54) MULTI-LAYERED CUSTOMIZATION FRAMEWORK

(71) Applicant: Salesforce, Inc., San Francisco, CA (US)

(72) Inventor: Dustin Allen Kirk, San Diego, CA (US)

(73) Assignee: Salesforce, Inc., San Francisco, CA (US)

( * ) Notice: Subject to any disclaimer, the term of this patent is extended or adjusted under 35 U.S.C. 154(b) by 240 days.

(21) Appl. No.: 18/488,830

(22) Filed: Oct. 17, 2023

(65) Prior Publication Data

US 2025/0124223 A1 Apr. 17, 2025

(51) Int. Cl.
*G06F 40/20* (2020.01)

(52) U.S. Cl.
CPC ................................... *G06F 40/20* (2020.01)

(58) Field of Classification Search
None
See application file for complete search history.

(56) References Cited

U.S. PATENT DOCUMENTS

| | | | | |
|---|---|---|---|---|
| 10,127,214 B2 * | 11/2018 | Munro et al. | .......... | G06Q 50/01 |
| 12,008,826 B2 * | 6/2024 | Wei | ........................ | G06F 18/285 |
| 2023/0161568 A1 * | 5/2023 | Kim et al. | ............. | G06N 20/00 |

OTHER PUBLICATIONS

Chronopoulou et al. Efficient Hierarchical Domain Adaptation for Pretrained Language Models, May 3, 2022.*
Jiao et al. "TinyBERT: Distilling BERT for Natural Language Understanding", Nov. 2020.*
Sanh et al. "DistilBERT, a distilled version of BERT: smaller, faster, cheaper and lighter", Mar. 2020.*

* cited by examiner

*Primary Examiner* — Paras D Shah
*Assistant Examiner* — Nicholas D Lowen
(74) *Attorney, Agent, or Firm* — Holland & Hart, LLP

(57) ABSTRACT

Methods, apparatuses, and computer-program products are disclosed. The method may include deriving a first intermediate LLM based on a broad spectrum LLM. The first intermediate LLM may be associated with a first level of a hierarchy and deriving the first intermediate LLM may include training the first intermediate LLM on first training data associated with the first level of the hierarchy. The method may include deriving a user-level LLM based on the first intermediate LLM, where the user-level LLM is associated with a user associated with a second level of the hierarchy included in the first level of the hierarchy. Deriving the user-level LLM may include training the user-level LLM on second training data associated with the user, where deriving the user-level LLM may further include inheriting one or more first characteristics from the first intermediate LLM.

18 Claims, 13 Drawing Sheets

600

Figure 12:
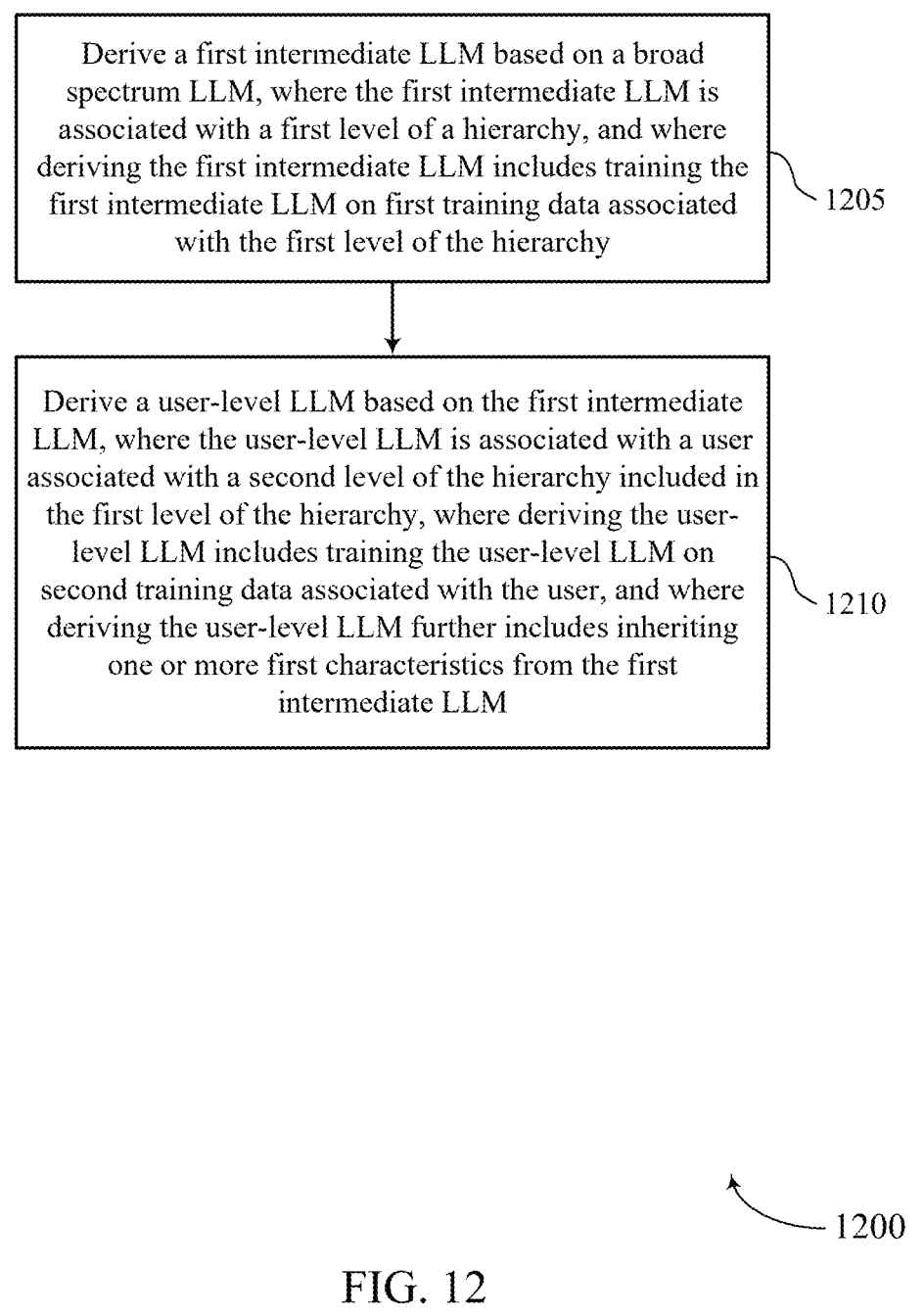

Derive a first intermediate LLM based on a broad
spectrum LLM, where the first intermediate LLM is
associated with a first level of a hierarchy, and where
deriving the first intermediate LLM includes training the
first intermediate LLM on first training data associated
with the first level of the hierarchy

1205

Derive a user-level LLM based on the first intermediate
LLM, where the user-level LLM is associated with a user
associated with a second level of the hierarchy included in
the first level of the hierarchy, where deriving the user-
level LLM includes training the user-level LLM on
second training data associated with the user, and where
deriving the user-level LLM further includes inheriting
one or more first characteristics from the first
intermediate LLM

Figure 13:
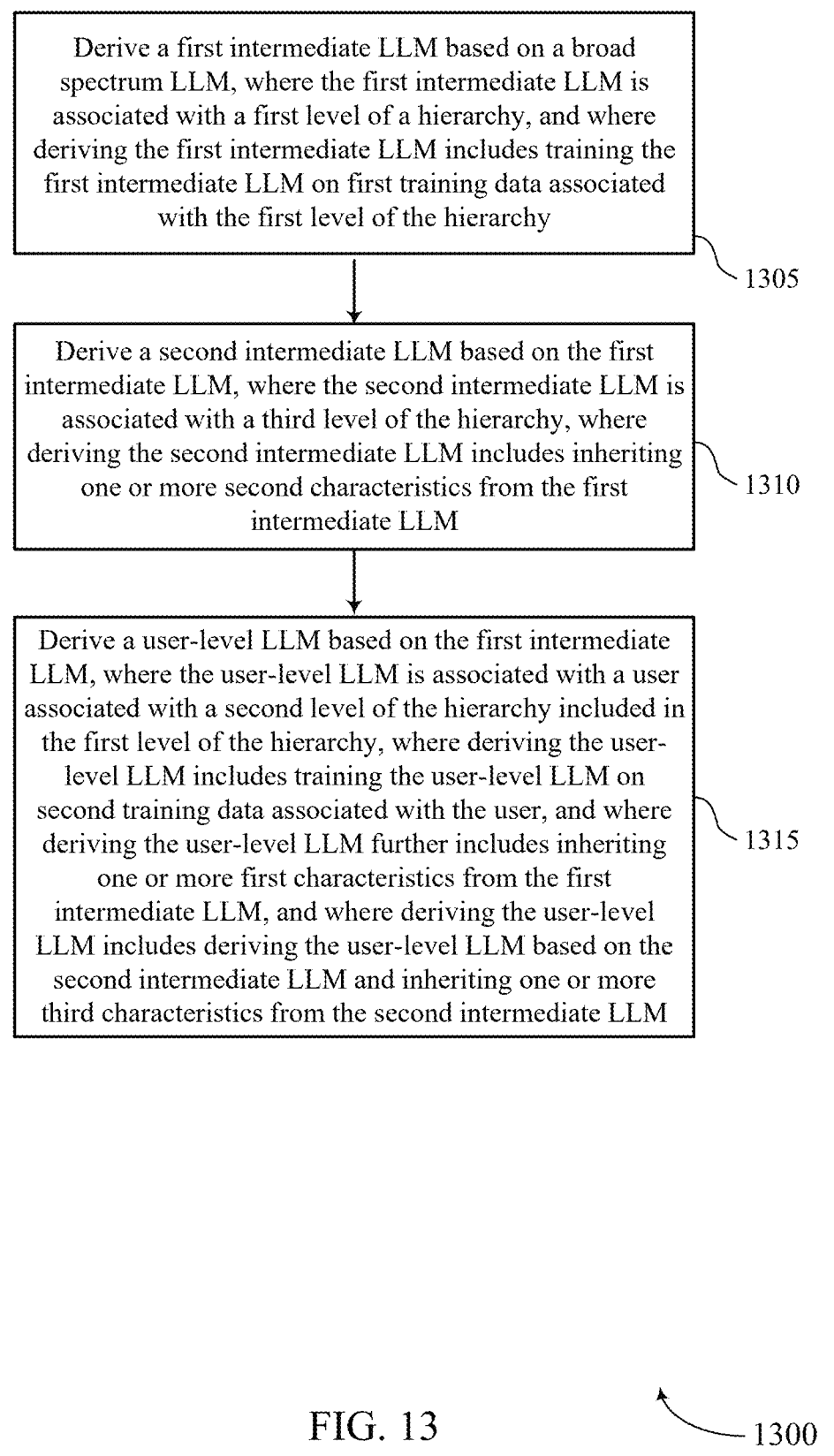

Derive a first intermediate LLM based on a broad spectrum LLM, where the first intermediate LLM is associated with a first level of a hierarchy, and where deriving the first intermediate LLM includes training the first intermediate LLM on first training data associated with the first level of the hierarchy

1305

Derive a second intermediate LLM based on the first intermediate LLM, where the second intermediate LLM is associated with a third level of the hierarchy, where deriving the second intermediate LLM includes inheriting one or more second characteristics from the first intermediate LLM

1310

Derive a user-level LLM based on the first intermediate LLM, where the user-level LLM is associated with a user associated with a second level of the hierarchy included in the first level of the hierarchy, where deriving the user-level LLM includes training the user-level LLM on second training data associated with the user, and where deriving the user-level LLM further includes inheriting one or more first characteristics from the first intermediate LLM, and where deriving the user-level LLM includes deriving the user-level LLM based on the second intermediate LLM and inheriting one or more third characteristics from the second intermediate LLM

MULTI-LAYERED CUSTOMIZATION FRAMEWORK

FIELD OF TECHNOLOGY

The present disclosure relates generally to database systems and data processing, and more specifically to multi-layered customization framework.

BACKGROUND

A cloud platform (i.e., a computing platform for cloud computing) may be employed by multiple users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cloud platform scenarios, the cloud platform, a server, or other device may employ a large language model (LLM). However, such methods may be improved.

BRIEF DESCRIPTION OF THE DRAWINGS

FIGS. 12 and 13 show flowcharts illustrating methods that support multi-layered customization framework in accordance with examples as disclosed herein.

DETAILED DESCRIPTION

Figure 1:
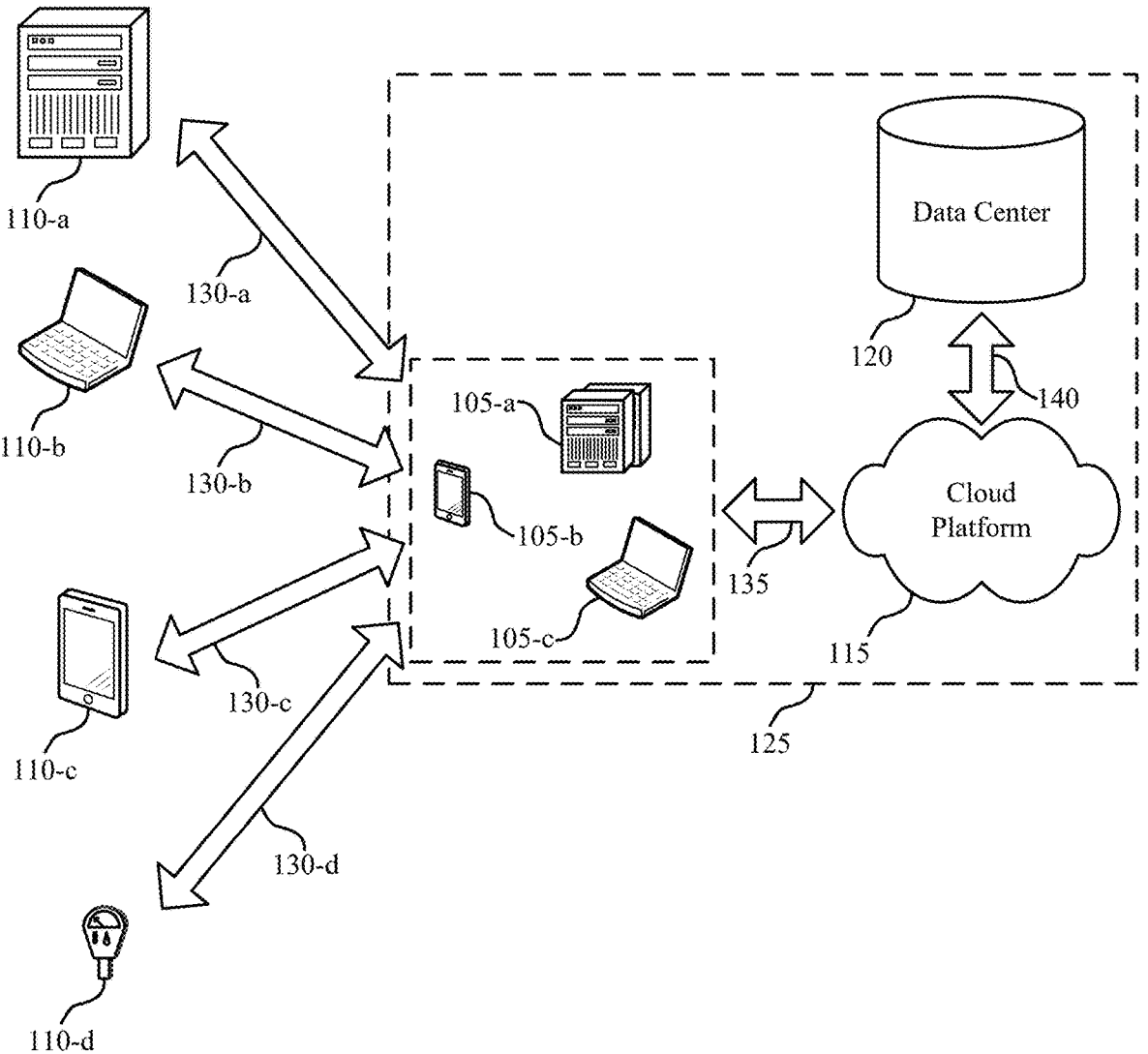
FIG. 1 illustrates an example of a generating a user-level large language model (LLM) system that supports multi-layered customization framework in accordance with examples as disclosed herein.

Large Language Models (LLMs) have become pivotal in driving efficiency and communication across various businesses and organizations. Such LLMs may serve many roles, helping software vendors provide productive experiences to end-users or serving as artificial intelligence (AI) assistants. However, the use of single foundational LLMs (e.g., broad spectrum LLMs) often leads to challenges, as they may not align with a software vendor's use case, tone, style, governance, or needs of individual users. The absence of a systematic approach to create derivative models tailored to each stakeholder, combined with a lack of consistent policy enforcement across derivative models, leads to misalignment with preferences and regulations. Further, existing solutions offer limited customization options that may differ between individual users. As such, current approaches may be improved to provide a more comprehensive, flexible, and scalable approach to customization that caters to multiple stakeholders while ensuring consistent policy and governance adherence.

A multi-layered customization framework may be employed to create derivative LLMs tailored to the needs, preferences, or use cases for particular users of an organization. Unlike existing solutions, this framework enables customization at multiple hierarchical levels, including software companies, customers, organizations, and individual users. For example, the use of such a framework may involve creation of a base LLM, followed by successive derivations of the base LLM that infuse industry knowledge, system protocols, governance data, and user-specific details into the derivative LLM models. Further, the framework may systematically enforce policies and governance of prior models at each derivation level, ensuring consistency and compliance throughout the entire process. The framework may also accept user inputs for customization of the various derivative models at various levels of the hierarchical structure and may further engage in maintenance and tracking of the hierarchical structure and the derivative LLMs (e.g., version control and tracking).

In some examples, a user may input one or more user preferences that may be used to generate the user-level LLM. In some examples, the information used to derive one or more of the LLMs (e.g., at any hierarchical level) may include domain knowledge, tone of voice information, style guide information, brand messaging information, product documentation, or any combination thereof. In some examples, the LLMs (e.g., the derived LLMs, the broad spectrum or foundational LLM, or any combination thereof) may be stored in a repository that may store associated metadata information. The metadata may describe relationships between LLMs (e.g., derivation relationships), versioning information, access control information, or any combination thereof. In some examples, the LLMs and metadata may be updated at times, and records of the updates may also be stored in the repository (e.g., in the metadata itself).

Aspects of the disclosure are initially described in the context of an environment supporting an on-demand database service. Aspects of the disclosure are then described with reference to a LLM derivation system, a LLM customization scheme, a LLM policy and governance scheme, a derivation scheme, a LLM hierarchy, a LLM repository scheme, and a process flow. Aspects of the disclosure are further illustrated by and described with reference to apparatus diagrams, system diagrams, and flowcharts that relate to multi-layered customization framework.

FIG. 1 illustrates an example of a system 100 for cloud computing that supports multi-layered customization framework in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to-client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The system 100 may be an example of a multi-tenant system. For example, the system 100 may store data and provide applications, solutions, or any other functionality for multiple tenants concurrently. A tenant may be an example of a group of users (e.g., an organization) associated with a same tenant identifier (ID) who share access, privileges, or both for the system 100. The system 100 may effectively separate data and processes for a first tenant from data and processes for other tenants using a system architecture, logic, or both that support secure multi-tenancy. In some examples, the system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the system 100 may run a single instance of software on a processing device (e.g., a server, server cluster, virtual machine) to serve multiple tenants. Such a multi-tenant system may provide for efficient integrations (e.g., using application programming interfaces (APIs)) by applying the integrations to the same software application and underlying architectures supporting multiple tenants. In some cases, processing resources, memory resources, or both may be shared by multiple tenants.

As described herein, the system 100 may support any configuration for providing multi-tenant functionality. For example, the system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The system 100 may support scaling of tenants within the multi-tenant system, for example, using scale triggers, automatic scaling procedures, scaling requests, or any combination thereof. In some cases, the system 100 may implement one or more scaling rules to enable relatively fair sharing of resources across tenants. For example, a tenant may have a threshold quantity of processing resources, memory resources, or both to use, which in some cases may be tied to a subscription by the tenant.

For example, the cloud platform 115 may coordinate the derivation or generation of LLMs tailored on the user level for individual users or applications (e.g., an autonomous bot or service that may be tailored for one or more applications, domains, roles, or other classifications). For example, the cloud platform 115 may receive input from a cloud client 105 to generate a user-level LLM. The cloud platform 115 may then derive one or more intermediate LLMs (e.g., that are associated with the cloud platform 115, one or more levels of an organization that may be associated with the cloud client 105 or the cloud platform 115, or any combination thereof) based on a broad spectrum LLM (e.g., a foundational LLM). The cloud platform 115 may derive the intermediate and user-level LLMs based on collecting or characteristics from different levels of an organizational hierarchy (e.g., which may include a hierarchy of an organization, a hierarchy associated with the cloud platform 115 (e.g., a software vendor), or any combination thereof), inheriting such characteristics from an earlier-derived LLM (e.g., that is associated with a different level of an organizational hierarchy), or both.

In some approaches, broad spectrum LLMs (sometimes referred to as foundational LLMs) may be used to provide additional functionalities to users. However, such broad spectrum LLMs may lead to challenges, as they may not align with the desired operations of a user, an organization, a software vendor, or other entity. Though such broad spectrum LLMs draw from broad knowledge bases to provide answers to queries, such knowledge bases are shallow and not suited to narrower requests. Further, such systems do not offer options for customizations, policy enforcement, and scalability while maintaining flexibility across different implementations (e.g., across different users or groups within an organization).

As such, the subject matter described herein involves multiple, iterative derivations of LLMs where different iterations may be associated with, derived on, or trained on information associated with different levels of an organization and characteristics of the derived LLMs may be inherited from previously-derived LLMs. In this way, policies, practices, and information may be distributed throughout LLMs in a consistent way while still allowing for customization and user preferences between different LLMs.

For example, a user may transmit a request to a system to derive a user-level LLM (e.g., for the user to use or for generation or derivation of an LLM that may be available to others, such as in a service tailored to a role or use case). The user may also transmit one or more user preferences, customizations, or information associated with the user's role or use case to the system. The user may further indicate the user's role or use case and how it relates to one or more other levels of an organizational hierarchy (e.g., so that the system may, in the process of deriving the user-level LLM, inherit policies, access control information, or other information from one or more intermediate LLMs associated with the organizational hierarchy). The system may derive the user-level LLM and may make the user-level LLM available to the user or other entity for use.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
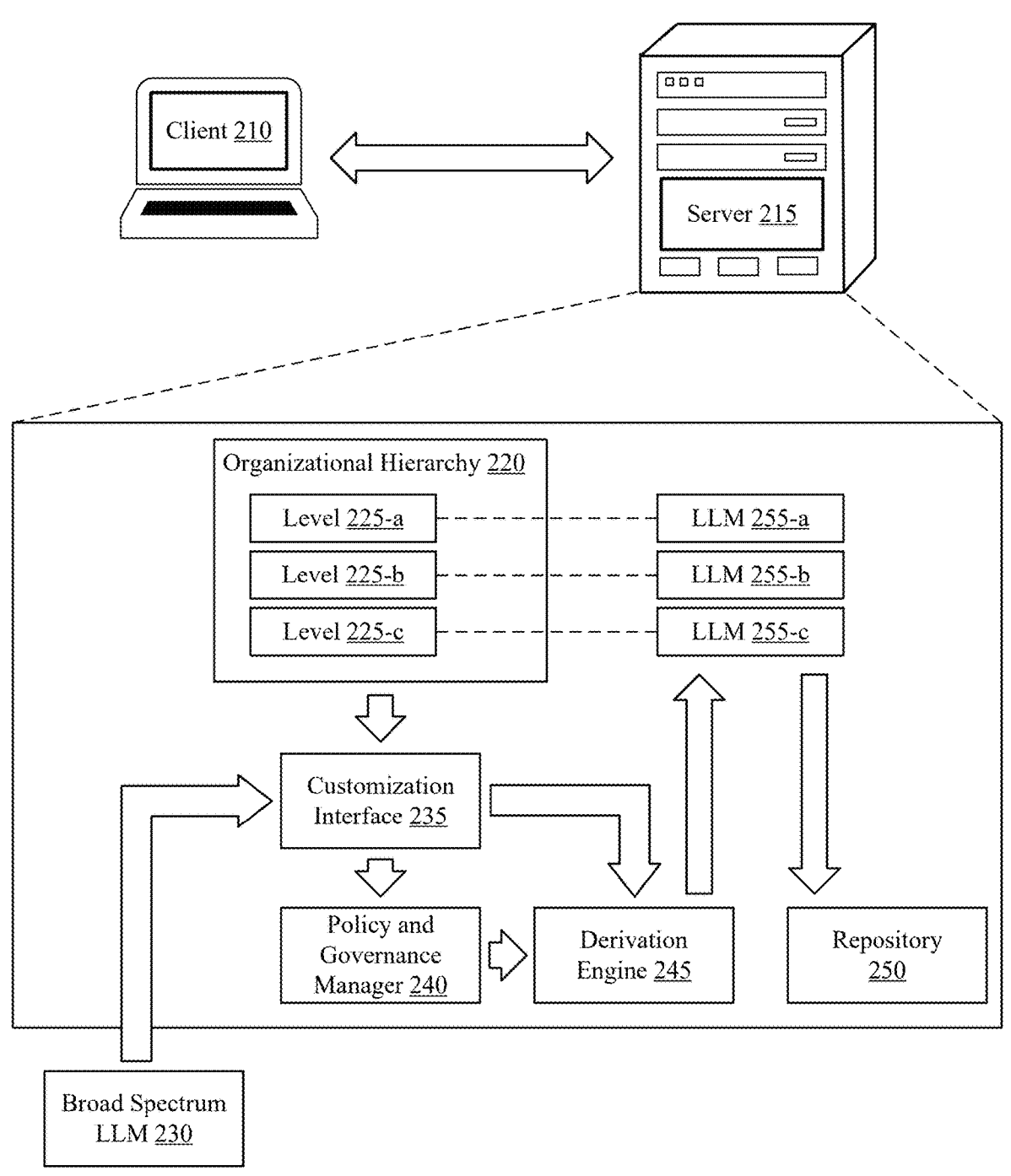
FIG. 2 shows an example of a LLM derivation system that supports multi-layered customization framework in accordance with examples as disclosed herein.

FIG. 2 shows an example of a LLM derivation system 200 that supports multi-layered customization framework in accordance with examples as disclosed herein.

The existing utilization of single broad spectrum LLMs (e.g., foundational LLMs) to serve as AI assistants does not sufficiently serve the varied considerations, tone, style, and governance considerations of software vendors, customers, and individual end-users. However, such approaches do not allow customization models for different considerations or use cases and further do not involve consistent policy enforcement across different LLMs. Such deficiencies lead to a misalignment with preferences and regulations.

For example, single-layer customization models may allow customization at only one level, usually at the organization's end. Unlike the subject matter described herein, they lack the ability to create derivative models specific to various stakeholders. In a further example, some existing models enforce policies but often without a systematic, multi-layered approach. Though some existing approaches provide some customization, they often focus only on specific elements like tone or terminology. Also, many solutions deploy static models that lack flexibility in customization. As such, there is an unmet desire for a scalable, multi-layered customization framework that can produce unique LLMs for each end-user, involving various factors, such as permissions, governance, corporate policies, tone-of-voice, and more.

The subject matter described herein may reduce or eliminate such deficiencies. For example, as depicted in the LLM derivation system, the client 210 may communicate with the server 215 to coordinate generation of the LLMs 255 that may be associated with the levels 225 of the organizational hierarchy 220. As described herein, the organizational hierarchy 220 may include a hierarchy or other arrangement associated with an organization (e.g., a business), a hierarchy or other arrangement associated with a cloud platform (e.g., which may include one or more customers of the cloud platform, the cloud platform as a whole, or any combination thereof) associated with the server 215, or any combination thereof. For example, level 225-a may be associated with the cloud platform, level 225-b may be associated with a customer utilizing the cloud platform (e.g., a business), and level 225-c may be associate with a user associated with the client 210. Thus, the server 215 (or one or more other elements of a cloud-based platform) may derive the LLM 255-*a* based on the broad spectrum LLM 230 (e.g., a foundational LLM), training data associated with the level 225-*a*, or both. The broad spectrum LLM 230 may serve as a foundational model upon which the derivative models are created. It may be a pre-trained large language model that encompasses a broad spectrum of human knowledge, acting as a starting point for customization, allowing subsequent layers to add specific industry knowledge, company details, user preferences, and other information. The stability and comprehensiveness of the broad spectrum LLM 230 promotes retention of general knowledge and functionality of the derived LLMs.

The server 215 may further derive the LLM 255-*b*, the LLM 255-*c*, or both based on training data associated with the level 225-*b*, the level 225-*c*, or both as well as an inheritance of one or more characteristics of the LLM 255-*a*. The LLM 255-*c* may also be trained on or derived based on an inheritance of characteristic of the LLM 255-*b*. Though these examples are described here, the organizational hierarchy 220 may include any quantity of levels 225 with which any quantity of LLMs 255 may be associated. For example, the organization hierarchy 220 may include another level 225 that may be associated with a team or other grouping of the business associated with level 225-*b*.

In some examples, the server 215 may utilize the customization interface 235 to receive and process information from the organizational hierarchy 220, including information associated with the levels 225, user input for preferences or customization, or any combination thereof. The customization interface 235 may be a user-friendly platform that facilitates the input of customization preferences at various hierarchical levels. The customization interface 235 may be used by software companies, customers, organizations, and individual users to inject their specific knowledge, tone, style guides, brand messaging, product documents, and governance data. The customization interface 235 also enables the multi-layered customization process and tailors the resulting LLMs according to distinct situations and specifications for various users.

The server 215 may utilize the policy and governance manager 240 to receive and process information associated with policies, governance, or other information that may be applied to derive the LLMs 255, such as though inheritance from an LLM used to derive another LLM, direct information input, training data, or any combination thereof. The policy and governance manager 240 may be responsible for maintaining and enforcing the guidelines, regulations, and policies at each level of model derivation. Further, the policy and governance manager 240 may promote consistent adoption and enforcement of policies and governance from prior models across derivative models, which improves compliance and consistency relating to both internal and external regulations.

The server 215 may utilize the derivation engine 245 to derive the LLMs 255 (e.g., utilizing information received or processed via the customization interface 235, the policy and governance manager 240, one or more of the LLMs 255, or any combination thereof). The derivation engine 245 may use the customization preferences, policy information, governance information, or any combination thereof to create derivative LLMs 255 based on these inputs. The derivation engine 245 may synthesize the provided customization data and policies to produce new, tailored models at different levels (e.g., of the 220). It transforms the customization preferences into an LLM 255 that aligns with user considerations, corporate branding, and compliance requirements.

The server 215 may store the LLMs 255 and associated metadata in the repository 250, which may be used for access control purposes, version control purposes, one or more other purposes, or any combination thereof. The repository 250 may be a storage system that houses all the derivative LLMs, maintaining a version history and hierarchical structure. The repository 250 serves as a centralized location for accessing and managing the created LLMs 255. It preserves the lineage of the models, allowing for easy tracking of versions, access control, and hierarchical relationships between different LLM 255, which may promote both the reuse and the analysis of different derivative LLMs 255.

The techniques described herein may be applied to any quantity of use cases, and the LLMs 255 derived herein may be used for such use cases. For example, the techniques described herein may be applied to a technology retailer situation. A technology retailer may employ the techniques described herein to create an AI assistant that integrates product specifications, support materials, and company-specific sales strategies. Individual sales representatives can further tailor this model to align with their personal sales approach, ensuring the AI assistant provides information consistent with their unique sales techniques and customer engagement practices.

In another example, the techniques described herein may be applied to a healthcare provider situation. In the healthcare sector, a hospital could create derivative LLMs that include medical guidelines, patient care protocols, and specific departmental practices. Individual medical professionals can further customize these models to align with their specializations, providing patient consultations and medical advice that adhere to the hospital's standards and the professional's unique approach.

In another example, the techniques described herein may be applied to a banking situation. A bank might create a model integrating global financial regulations, country-specific laws, and internal compliance guidelines. Individual branches and banking professionals could further tailor this model to align with local regulations and customer service practices, ensuring that customer engagements are both personalized and compliant with all relevant legal standards.

In another example, the techniques described herein may be applied to an educational institution situation. Universities and schools can create AI assistants that include educational standards, curricular guidelines, and specific course materials. Professors and teachers can further tailor these models to their teaching styles and subject matter, providing students with an AI-powered learning assistant that reflects the unique educational approach of each educator.

In another example, the techniques described herein may be applied to a customer relationship management situation. Specifically involving CRM, a software company might utilize this system to enhance their CRM platform. Starting with an LLM incorporating industry best practices, the company can create a derivative model that includes detailed information about their software offerings, support materials, and sales strategies. Customers using the CRM platform can further customize this model to include their product catalogs, customer engagement strategies, and specific marketing materials. Individual sales and support representatives can tailor the model to align with their personal engagement styles and customer portfolios. The result is a highly personalized and efficient AI assistant that provides precise support within the CRM system, aligning with the specific needs of the software company, its customers, and the individual users within those organizations. This ensures that interactions within the CRM are tailored to the specific context, improving both efficiency and customer satisfaction.

The techniques described herein may enable customization of AI assistants at multiple hierarchical levels, including software companies, customers, organizations, and individual users, to ensure a tailored experience. Further, the techniques described herein may enforce policies and governance consistently across derivative models, maintaining alignment with established guidelines and compliance needs. Further, the techniques described herein may facilitate the seamless integration of diverse inputs such as domain-specific knowledge, tone, style, brand messaging, product documents, and more, allowing a comprehensive customization process. Further, the techniques described herein may provide a scalable and flexible framework that accommodates varying customization needs across different stakeholders without sacrificing efficiency or coherence. Further, the techniques described herein may implement a structured, hierarchical approach to retain and manage modifications at each level of derivation, preserving the essence of customization while ensuring traceability and version control. Further, the techniques described herein may offer solutions to the challenge of large language model customization that encompasses a wide array of preferences, requirements, and policy adherence, going beyond what existing solutions offer in the field.

Figure 3:
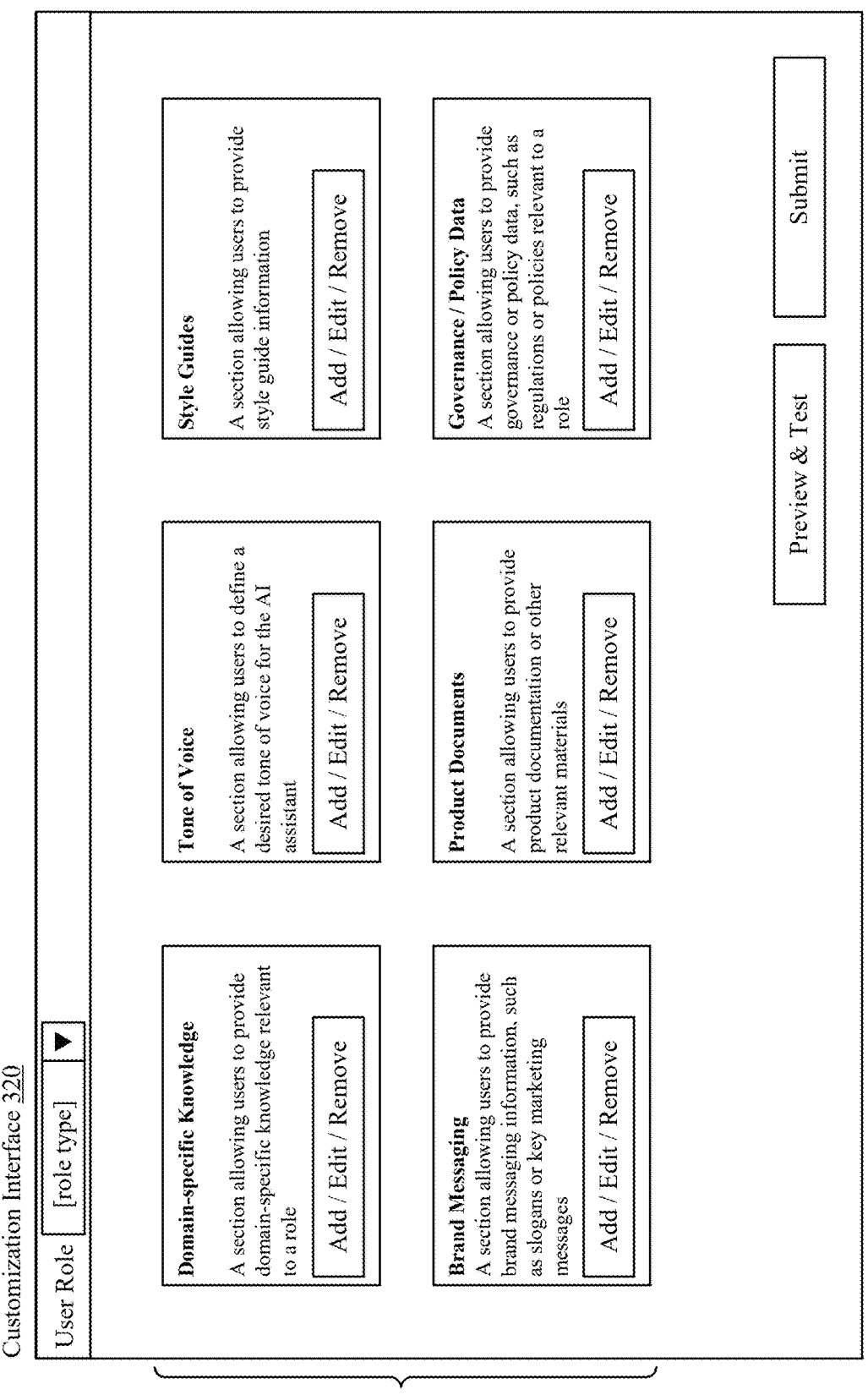
FIG. 3 shows an example of a LLM customization scheme that supports multi-layered customization framework in accordance with examples as disclosed herein.

FIG. 3 shows an example of a LLM customization scheme 300 that supports multi-layered customization framework in accordance with examples as disclosed herein. The customization interface 320 may include various customization inputs 325 that may be used to customize one or more aspects of the LLMs being derived. For example, the customization inputs 325 may include, but are not limited to, domain-specific knowledge, tone of voice information, style guide information, brand messaging information, product document information, governance data, policy data, other customization information, or any combination thereof. Further, the different inputs 325 may be provided by different users, groups, organizations, or any combination thereof. For example, an individual user within an organization may provide domain-specific knowledge or information that may be related to the role of the individual user, and a leader of a group within the organization (e.g., that may include the user) may provide tone of voice information, style guide information, brand messaging information, product document information, or any combination thereof, that may be applicable across the group (e.g., and therefore across any LLMs associated within individual users within the group). Further, a leader of the organization may define governance and policy data that may be applicable across the entire organization in which the group is included (e.g., and thus may be applicable to all LLMs created that are associated with the organization as a whole, the group as a whole, and for individual users).

Figure 4:
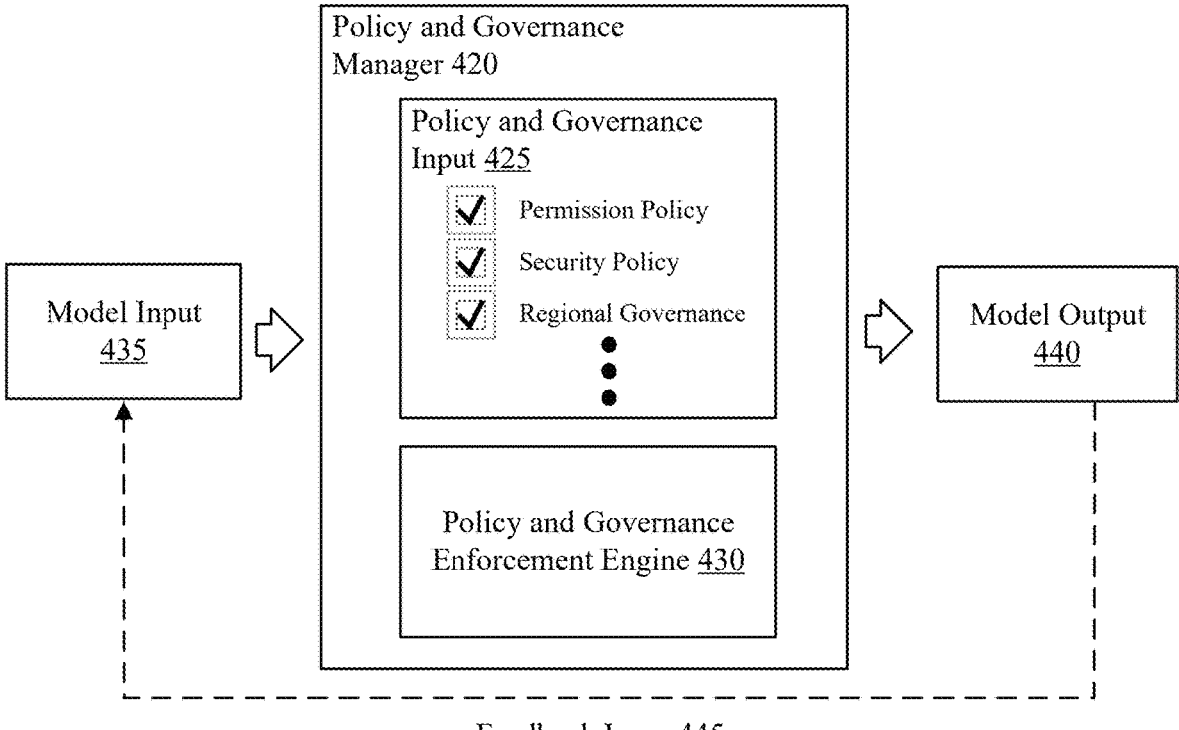
FIG. 4 shows an example of a LLM policy and governance scheme that supports multi-layered customization framework in accordance with examples as disclosed herein.

FIG. 4 shows an example of a LLM policy and governance scheme 400 that supports multi-layered customization framework in accordance with examples as disclosed herein. The policy and governance manager 420 may be used to enforce policies and governance of prior-derived LLMs into newly-derived LLMs and may do so at each level of derivation. For example, the policy and governance manager 420 may receive the model input 435, which may correspond to policy information, governance information, or both, from prior-derived LLMs. Further, the policy and governance manager 420 may also receive the policy and governance input 425 that may include policy and governance information from different roles or organizational levels (e.g., a cloud-based platform level, a customer level (e.g., a company that is a customer of the cloud-based platform), an organization level, a user level, or any combination thereof). The policy and governance enforcement engine 430 may perform the actual functions of asserting the model input 435, the policy and governance input 425, or both, on newly-created or newly-derived LLMs or as part of the derivation or creation process. For example, the policy and governance manager 420 may receive the model input 435 containing policy information from a "parent" LLM and may further receive the policy and governance input 425 that may include further policy information provided by a user or administrator. The policy and governance manager 420 may then enforce such information on a newly-derived LLM or may transmit such information to a derivation engine to derive the LLM based on the model input 435 and the policy and governance input 425. In either case, the model output 440 may be generated, which may include an output model that is based on the policy and governance input 425, the model input 435, or both. Additionally, or alternatively, the model output 440 may include information that is to be provided to a derivation engine that may derive the LLM. In some examples, the feedback loop 445 may feedback information or LLMs including the policy and governance input 425, the model input 435, or both to the input of the policy and governance manager 420 so that information applied to a first LLM may be applied to a second LLM (e.g., in a case where the first LLM is associated with an organizational level that encompasses a second organizational level with which the second LLM is associated, thereby inheriting the policy information, governance information, or both from the first LLM to the second LLM).

Figure 5:
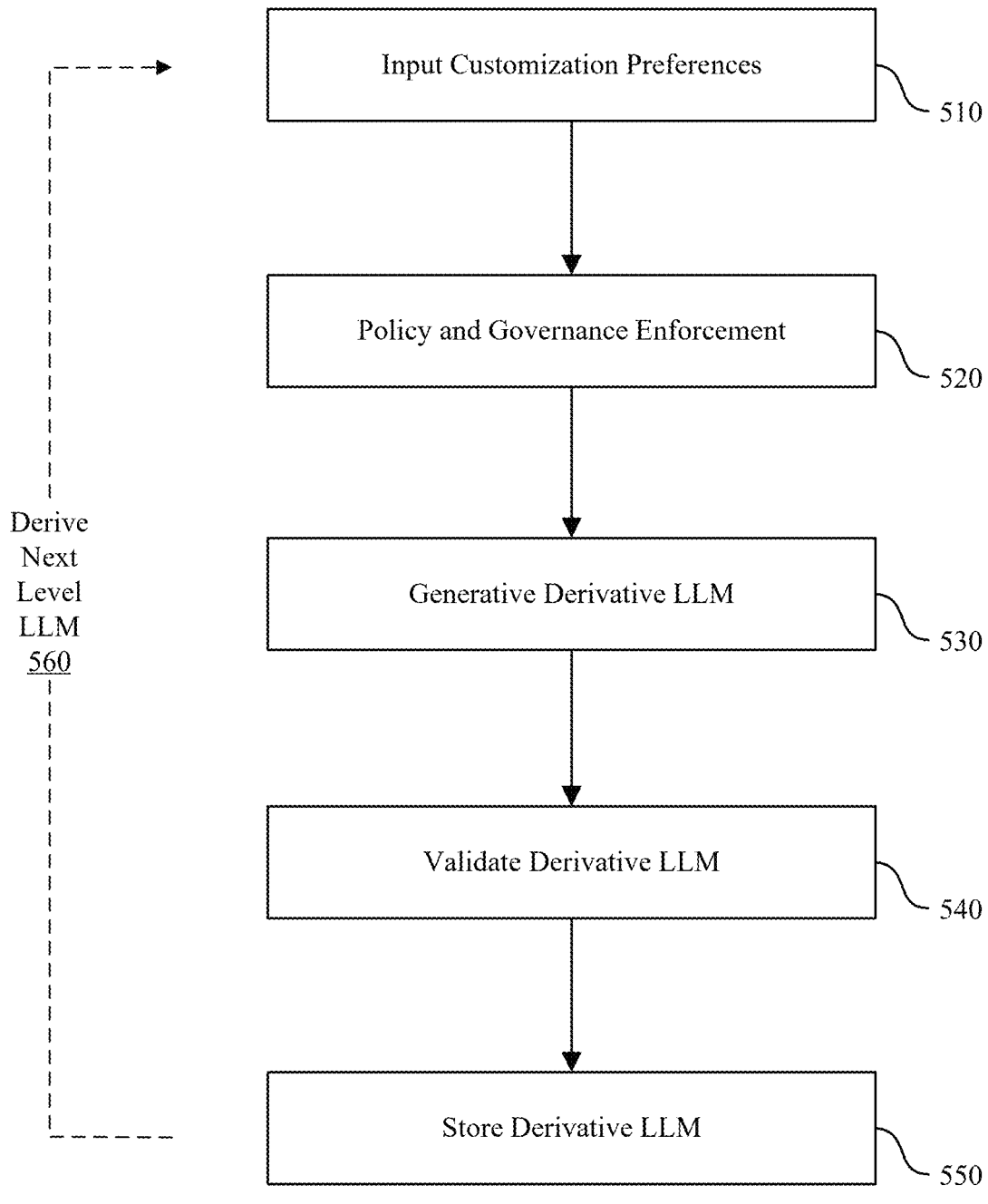
FIG. 5 shows an example of a derivation scheme that supports multi-layered customization framework in accordance with examples as disclosed herein.

FIG. 5 shows an example of a derivation scheme 500 that supports multi-layered customization framework in accordance with examples as disclosed herein. In the derivation scheme 500, a system may perform iterative processes to derive multiple LLMs while inheriting characteristics from higher level LLMs to lower level LLMs (e.g., where a higher level LLM is associated with an organizational level that encompasses a second organizational level with which a lower level LLM is associated). Such a process may create derivative LLMs based on customization preferences (e.g., those described in connection with the customization interface) and policy and governance information (e.g., described in connection with the policy and governance manager).

In some examples, the system may select an appropriate pre-trained LLM, such as the LLM 230, to serve as a foundation for creating derivative LLMs as described herein. The system may then proceed with the procedures shown. For example, at 510, users may provide customization preferences through a customization interface, such as customization interface 235 or customization interface 320. The system may identify and collect relevant documents, guidelines, style guides, other information, or any combination thereof for customization, which may be collected via the customization interface 235. Such an interface may be built with frameworks like React, Vue.js, backend APIs using technologies like Node.js, Django, or Flask, or any combination thereof.

At 520, the system may enforce policies, governance, or both from a policy and governance manager, such as policy and governance manager 240 or policy and governance manager 420. For example, the system may set up one or more rules, regulations, and guidelines to be followed by the resulting LLMs, which may be performed via a policy and governance manager. Such a policy and governance manager may include or be associated with one or more identity or access management tools, policy enforcement tools, or any combination thereof.

At 530, the system may generate a derivative LLM based on the customization information received at 510, the policy and governance information received at 520, or both. For example, the system may fine-tune the base model using the collected customization data and preferences, optionally applying layered customizations based on hierarchical considerations, ensuring that the derivative LLM meets quality and compliance standards. The system may employ frameworks such as TensorFlow, PyTorch, or Hugging Face. The system may also employ the use of transformers, hyperparameter optimization tools, or any combination thereof to improve the fine-tuning process.

At 540, the system may validate the derivative LLM to ensure compliance with the policy and governance information received at 520. For example, the system may employ metrics such as bilingual evaluation understudy (BLEU) scores, perplexity scores, one or more other metrics, or any combination thereof, to assess the performance and suitability of the LLMs. The system may employ continuous integration (CI) tools, continuous deployment (CD) tools, or both, such as Jenkins, GitLab CI. Additionally, or alternatively, the system may employ containerization platforms, such as Docker and Kubernetes.

At 550, the system may store the derivative LLM, such as at a repository at which version control, access control, and other operations may be performed. For example, the system may store the derivative model in the model repository, maintaining its version and relationship with other models. The system may employ database approaches such as MongoDB or PostgreSQL, or other database approaches that include versioning control and data structures to handle LLM hierarchies. Additionally, or alternatively, the system may continuously or regularly track the LLM's performance and user feedback, make updates to existing LLMs, and create new derivatives if required. The system may employ monitoring tools such as Prometheus, Grafana, web analytics tools such as Google Analytics, or any combination thereof.

At 560, the system may repeat the same or a similar process, where the created LLM may serve as a basis for deriving another LLM, such as through inheriting one or more characteristics or information from the created LLM. In this way, characteristics, policy information, governance information, other information, or any combination thereof may be inherited in derived LLMs, providing uniform application of policy and governance information (or other information) while allowing individual LLMs to be customized and tailored for different roles or use cases.

Though some example tools or techniques for implementing the subject matter herein are described, other suitable tools or techniques may be employed, including the use of purpose-built tools or implementations for carrying out the subject matter described herein.

Figure 6:
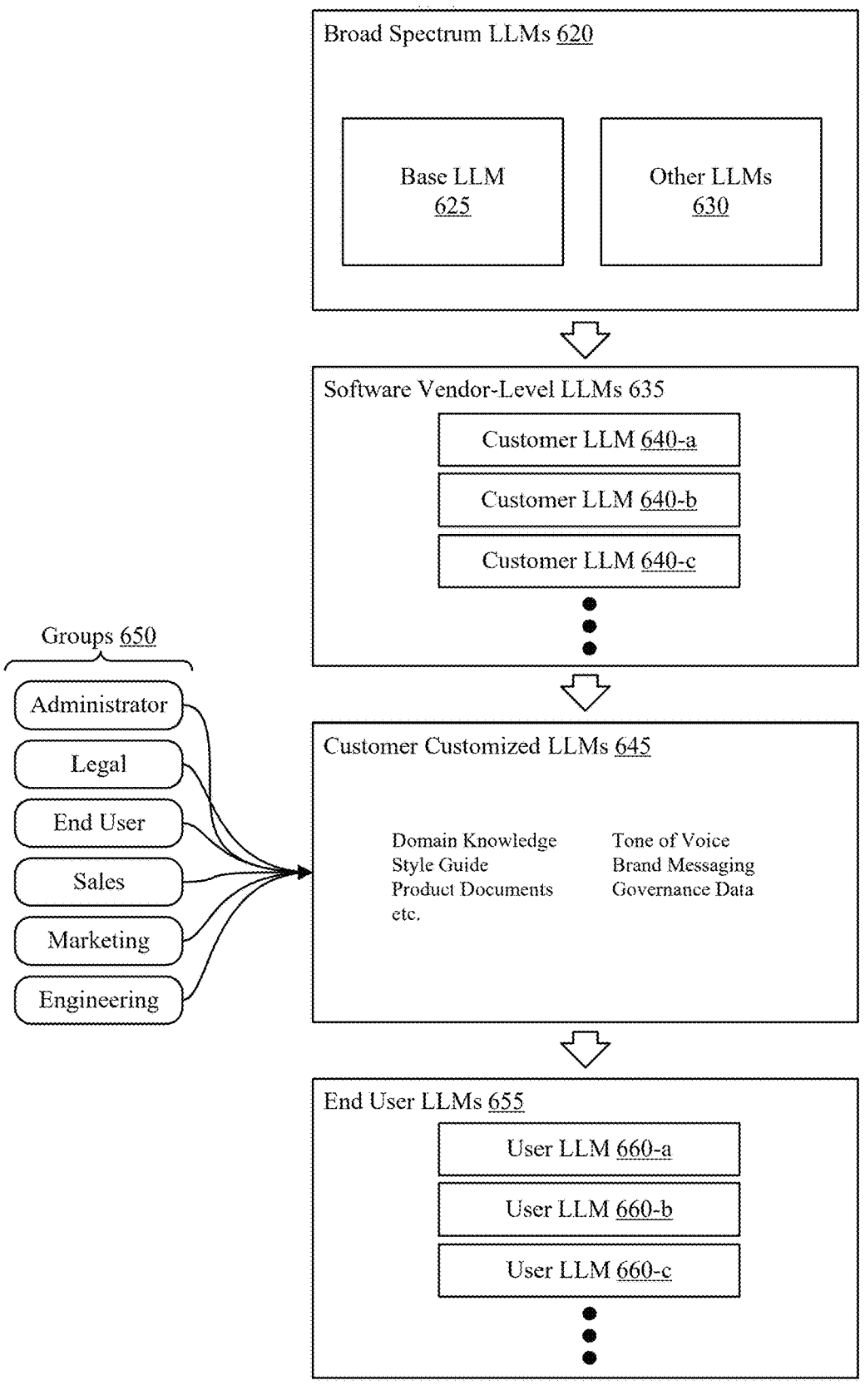
FIG. 6 shows an example of a LLM hierarchy that supports multi-layered customization framework in accordance with examples as disclosed herein.

FIG. 6 shows an example of a LLM hierarchy 600 that supports multi-layered customization framework in accordance with examples as disclosed herein. The LLM hierarchy 600 may include broad spectrum LLMs 620, software vendor-level LLMs 635, customer customized LLMs 645, and end user LLMs 655, including the LLMs 660. The LLM hierarchy 600 may further demonstrate the structure and relationships between various LLMs, how various LLMs are derived at different levels (e.g., software companies, customers, organizations, and individual users), how polices and governance of higher level models are inherited in lower level models.

For example, the broad spectrum LLMs 620 may include a base LLM 625, which may be a general purpose LLM, and one or more other LLMs 630, which may be any model utilized by an end user along with the base LLM 625. The software vendor-level LLMs 635 may include one or more LLMs, such as LLMS 640, that may be LLMs that are build and integrated for different customers that may access a cloud-based platform implementing the subject matter described herein. The customer customized LLMs 645 may include LLMs that are customized based on input from different groups 650 of an organization and may include various types of input. The customer customized LLMs 645 may fall under an umbrella of a customer LLM 640, as the groups 650 may be associated with such respective customers, each of which may be associated with one of the customer LLMs 640. Finally, the end user LLMs 655 may include the user LLMs 660 which may be unique or further customized LLMs that involve preferences of individual users or use cases alongside characteristics, policies, governance, other information received from the groups 650 and included in the customer customized LLMs 645, the software vendor-level LLMs 635, and the broad spectrum LLMs 620.

Figure 7:
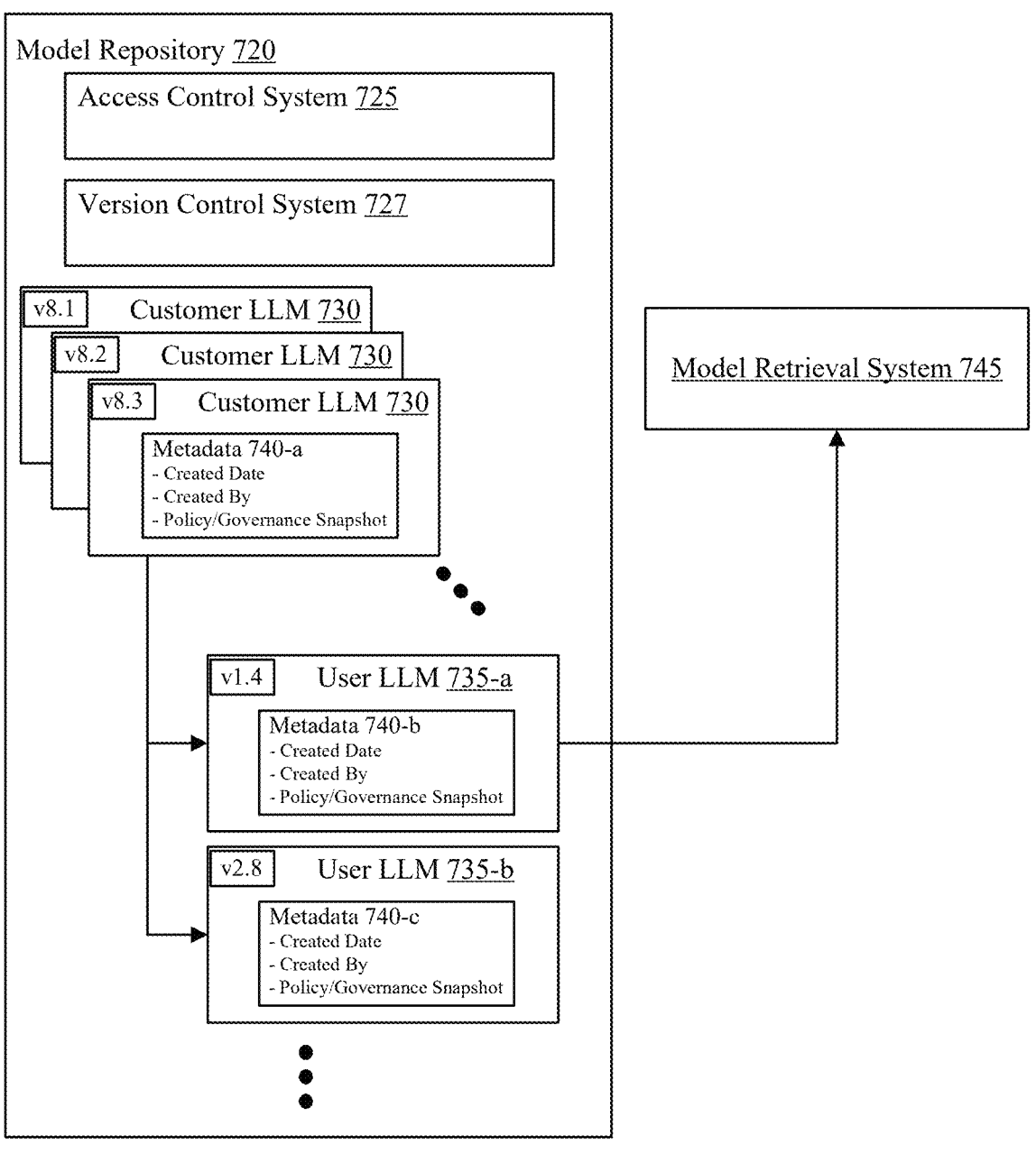
FIG. 7 shows an example of a LLM repository scheme that supports multi-layered customization framework in accordance with examples as disclosed herein.

FIG. 7 shows an example of a LLM repository scheme 700 that supports multi-layered customization framework in accordance with examples as disclosed herein. The repository scheme 700 may involve a model repository 720, which may store and manage various LLMs (e.g., the customer LLM 730, user LLMs 735, one or more other LLMs, or any combination thereof) through the use of the access control system 725, the version control system 727, the model retrieval system 745, one or more other systems, or any combination thereof.

The access control system 725 may allow the system to manage and restrict access to the stored LLMs based on user roles and permissions. For example, a user associated with user LLM 735-*a* may not be permitted to access the user LLM 735-*b*, but may access the user LLM 735-*a*.

The version control system 727 may aid in management of various version of the same LLM that are stored in the model repository 720. For example, the version control system 727 may aid the model repository 720 in managing version 8.1, 8.2, and 8.3 of the customer LLM 730 by storing metadata 740-*a* for each of the versions of the customer LLM 730 and providing access to different versions (e.g., for retrieval by the model retrieval system).

Figure 8:
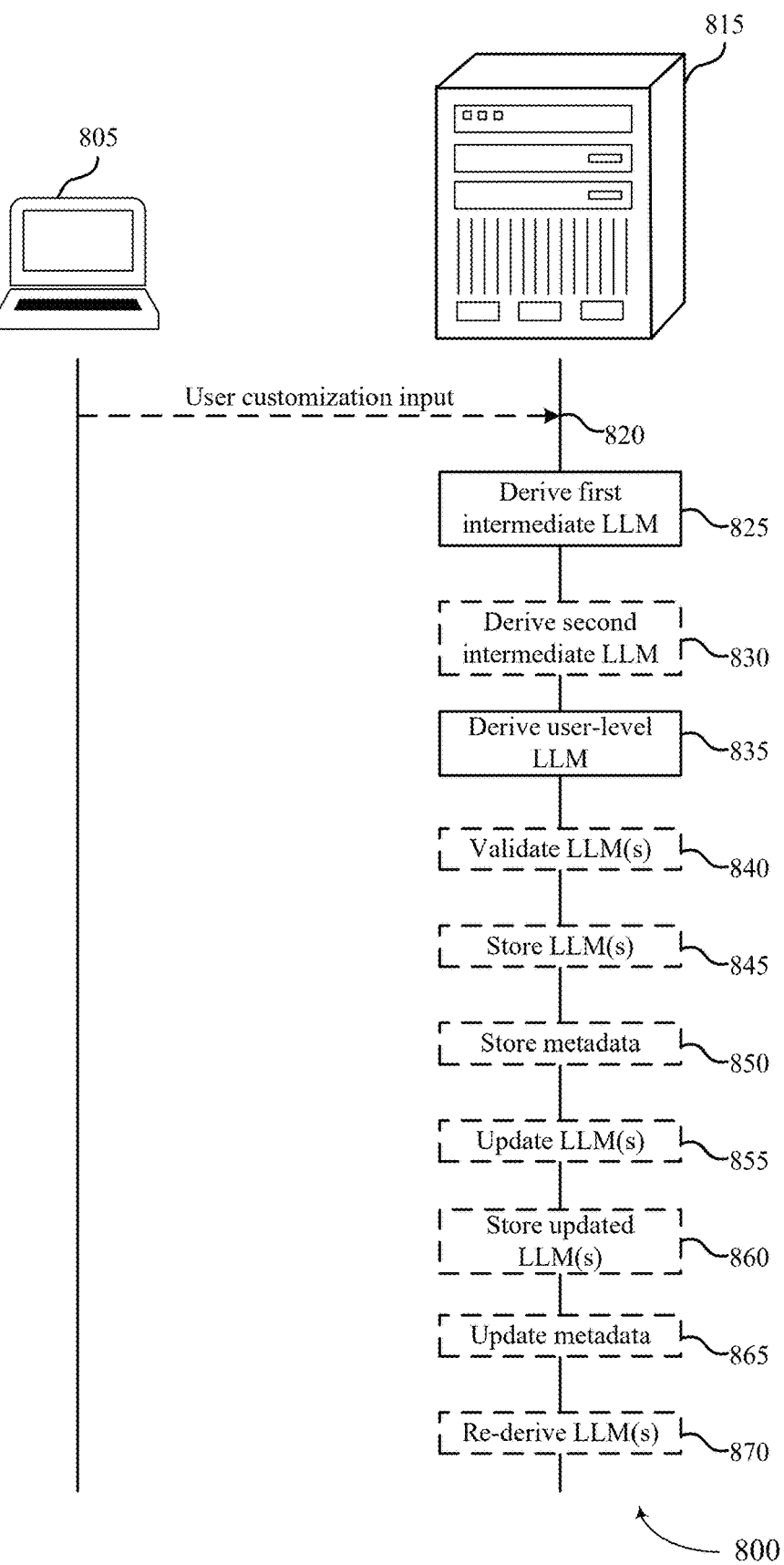
FIG. 8 shows an example of a process flow that supports multi-layered customization framework in accordance with examples as disclosed herein.

FIG. 8 shows an example of a process flow 800 that supports multi-layered customization framework in accordance with examples as disclosed herein. The process flow 800 may implement various aspects of the present disclosure described herein. The elements described in the process flow 800 (e.g., server 815 and client 805) may be examples of similarly named elements described herein.

In the following description of the process flow 800, the operations between the various entities or elements may be performed in different orders or at different times. Some operations may also be left out of the process flow 800, or other operations may be added. Although the various entities or elements are shown performing the operations of the process flow 800, some aspects of some operations may also be performed by other entities or elements of the process flow 800 or by entities or elements that are not depicted in the process flow, or any combination thereof.

At 820, the server 815 may receive user input that may indicate one or more user preferences associated with the user.

At 825, the server 815 may derive a first intermediate LLM based on a broad spectrum LLM and the first intermediate LLM is associated with a first level of a hierarchy, and wherein deriving the first intermediate LLM may include training the first intermediate LLM on first training data associated with the first level of the hierarchy. In some examples, > the broad spectrum LLM is a general-purpose LLM trained on data unassociated with the hierarchy. In some examples, training the first intermediate LLM may include training the first intermediate LLM on data associated with a plurality of tenants of a multi-tenant system and the first level of the hierarchy is associated with the multi-tenant system. In some examples, the first training data, the second training data, or any combination thereof may include domain knowledge associated with a role of the user, tone of voice information, style guide information, brand messaging information, product documentation, governance data, preference information, or any combination thereof.

At 830, the server 815 may derive a second intermediate LLM based on the first intermediate LLM and the second intermediate LLM is associated with a third level of the hierarchy. In some examples, deriving the second intermediate LLM may include inheriting one or more second characteristics from the first intermediate LLM.

At 835, the server 815 may derive a user-level LLM based on the first intermediate LLM and the user-level LLM is associated with a user associated with a second level of the hierarchy comprised in the first level of the hierarchy and deriving the user-level LLM may include training the user-level LLM on second training data associated with the user, and wherein deriving the user-level LLM further may include inheriting one or more first characteristics from the first intermediate LLM. In some examples, the one or more first characteristics comprise policy information, governance information, customization preferences, legal information, access control information, or any combination thereof. In some examples, deriving the user-level LLM may include deriving the user-level LLM based on the second intermediate LLM and inheriting one or more third characteristics from the second intermediate LLM. In some examples, deriving the user-level LLM is based on the one or more user preferences. In some examples, the first training data, the second training data, or any combination thereof may include domain knowledge associated with a role of the user, tone of voice information, style guide information, brand messaging information, product documentation, governance data, preference information, or any combination thereof.

At 840, the server 815 may validate the first intermediate LLM, the user-level LLM, or both.

At 845, the server 815 may store the first intermediate LLM, the user-level LLM, or any combination thereof, in an LLM repository.

At 850, the server 815 may store metadata associated with the first intermediate LLM, the user-level LLM, or any combination thereof, the metadata that may include LLM lineage information, LLM relationship information, LLM version information, access control information, or any combination thereof.

At 855, the server 815 may update the user-level LLM.

At 860, the server 815 may store the updated user-level LLM in the LLM repository.

At 865, the server 815 may update the metadata associated with the user-level LLM based on the updated user-level LLM.

At 870, the server 815 may re-derive the first intermediate LLM, the user-level LLM, or both, based on one or more changes to the broad spectrum LLM, the first intermediate LLM, or both.

Figure 9:
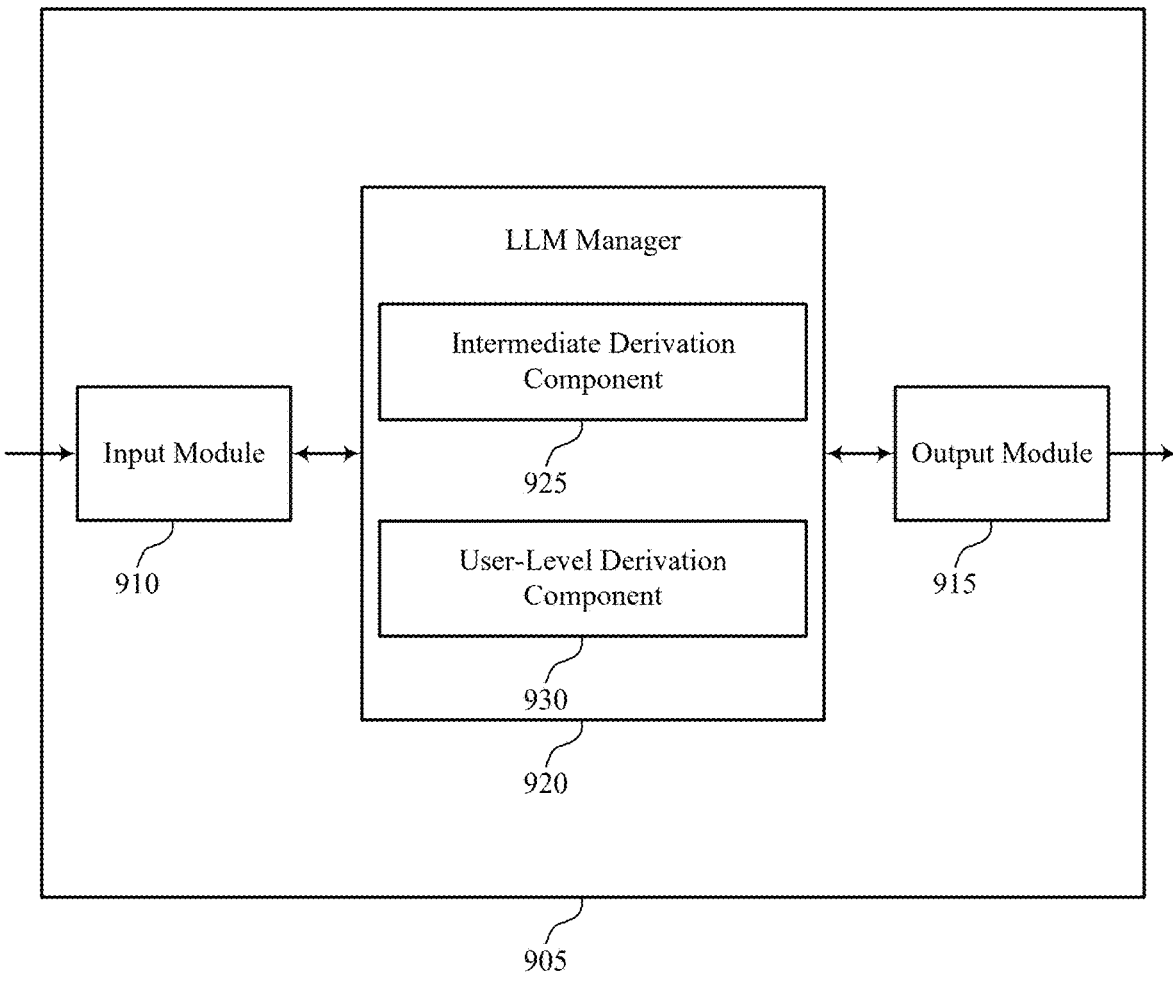
FIG. 9 shows a block diagram of an apparatus that supports multi-layered customization framework in accordance with examples as disclosed herein.

FIG. 9 shows a block diagram 900 of a device 905 that supports multi-layered customization framework in accordance with examples as disclosed herein. The device 905 may include an input module 910, an output module 915, and an LLM manager 920. The device 905, or one or more components of the device 905 (e.g., the input module 910, the output module 915, and the LLM manager 920), may include at least one processor, which may be coupled with at least one memory, to support the described techniques. Each of these components may be in communication with one another (e.g., via one or more buses).

The input module 910 may manage input signals for the device 905. For example, the input module 910 may identify input signals based on an interaction with a modem, a keyboard, a mouse, a touchscreen, or a similar device. These input signals may be associated with user input or processing at other components or devices. In some cases, the input module 910 may utilize an operating system such as iOS®, ANDROID®, MS-DOS®, MS-WINDOWS®, OS/2®, UNIX®, LINUX®, or another known operating system to handle input signals. The input module 910 may send aspects of these input signals to other components of the device 905 for processing. For example, the input module 910 may transmit input signals to the LLM manager 920 to support multi-layered customization framework. In some cases, the input module 910 may be a component of an input/output (I/O) controller 1110 as described with reference to FIG. 11.

The output module 915 may manage output signals for the device 905. For example, the output module 915 may receive signals from other components of the device 905, such as the LLM manager 920, and may transmit these signals to other components or devices. In some examples, the output module 915 may transmit output signals for display in a user interface, for storage in a database or data store, for further processing at a server or server cluster, or for any other processes at any quantity of devices or systems. In some cases, the output module 915 may be a component of an I/O controller 1110 as described with reference to FIG. 11.

For example, the LLM manager 920 may include an intermediate derivation component 925 a user-level derivation component 930, or any combination thereof. In some examples, the LLM manager 920, or various components thereof, may be configured to perform various operations (e.g., receiving, monitoring, transmitting) using or otherwise in cooperation with the input module 910, the output module 915, or both. For example, the LLM manager 920 may receive information from the input module 910, send information to the output module 915, or be integrated in combination with the input module 910, the output module 915, or both to receive information, transmit information, or perform various other operations as described herein.

The LLM manager 920 may support generating a user-level large language model (LLM) in accordance with examples as disclosed herein. The intermediate derivation component 925 may be configured to support deriving a first intermediate LLM based on a broad spectrum LLM, where the first intermediate LLM is associated with a first level of a hierarchy, and where deriving the first intermediate LLM includes training the first intermediate LLM on first training data associated with the first level of the hierarchy. The user-level derivation component 930 may be configured to support deriving a user-level LLM based on the first intermediate LLM, where the user-level LLM is associated with a user associated with a second level of the hierarchy included in the first level of the hierarchy, where deriving the user-level LLM includes training the user-level LLM on second training data associated with the user, and where deriving the user-level LLM further includes inheriting one or more first characteristics from the first intermediate LLM.

Figure 10:
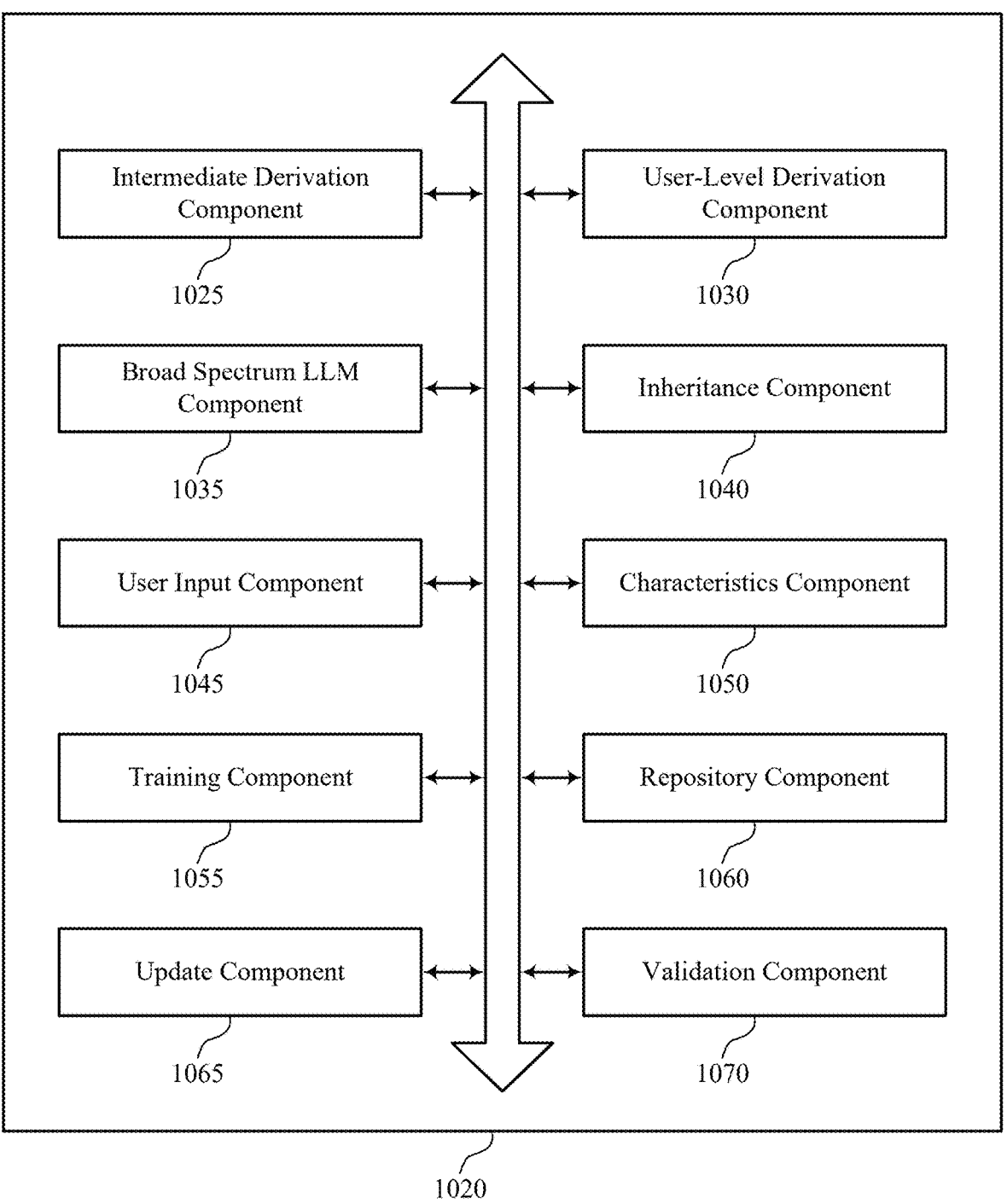
FIG. 10 shows a block diagram of an LLM manager that supports multi-layered customization framework in accordance with examples as disclosed herein.

FIG. 10 shows a block diagram 1000 of an LLM manager 1020 that supports multi-layered customization framework in accordance with examples as disclosed herein. The LLM manager 1020 may be an example of aspects of an LLM manager or an LLM manager 920, or both, as described herein. The LLM manager 1020, or various components thereof, may be an example of means for performing various aspects of multi-layered customization framework as described herein. For example, the LLM manager 1020 may include an intermediate derivation component 1025, a user-level derivation component 1030, a broad spectrum LLM component 1035, an inheritance component 1040, a user input component 1045, a characteristics component 1050, a training component 1055, a repository component 1060, an update component 1065, a validation component 1070, or any combination thereof. Each of these components, or components of subcomponents thereof (e.g., one or more processors, one or more memories), may communicate, directly or indirectly, with one another (e.g., via one or more buses).

The LLM manager 1020 may support generating a user-level large language model (LLM) in accordance with examples as disclosed herein. The intermediate derivation component 1025 may be configured to support deriving a first intermediate LLM based on a broad spectrum LLM, where the first intermediate LLM is associated with a first level of a hierarchy, and where deriving the first intermediate LLM includes training the first intermediate LLM on first training data associated with the first level of the hierarchy. The user-level derivation component 1030 may be configured to support deriving a user-level LLM based on the first intermediate LLM, where the user-level LLM is associated with a user associated with a second level of the hierarchy included in the first level of the hierarchy, where deriving the user-level LLM includes training the user-level LLM on second training data associated with the user, and where deriving the user-level LLM further includes inheriting one or more first characteristics from the first intermediate LLM.

In some examples, the broad spectrum LLM is a general-purpose LLM trained on data unassociated with the hierarchy. In some examples, training the first intermediate LLM includes training the first intermediate LLM on data associated with a set of multiple tenants of a multi-tenant system, where the first level of the hierarchy is associated with the multi-tenant system.

In some examples, the intermediate derivation component 1025 may be configured to support deriving a second intermediate LLM based on the first intermediate LLM, where the second intermediate LLM is associated with a third level of the hierarchy. In some examples, the inheritance component 1040 may be configured to support where deriving the second intermediate LLM includes inheriting one or more second characteristics from the first intermediate LLM. In some examples, the user-level derivation component 1030 may be configured to support where deriving the user-level LLM includes deriving the user-level LLM based on the second intermediate LLM and inheriting one or more third characteristics from the second intermediate LLM.

In some examples, the user input component 1045 may be configured to support receiving user input indicating one or more user preferences associated with the user, where deriving the user-level LLM is based on the one or more user preferences.

In some examples, the one or more first characteristics include policy information, governance information, customization preferences, legal information, access control information, or any combination thereof.

In some examples, the first training data, the second training data, or any combination thereof includes domain knowledge associated with a role of the user, tone of voice information, style guide information, brand messaging information, product documentation, governance data, preference information, or any combination thereof.

In some examples, the repository component 1060 may be configured to support storing the first intermediate LLM, the user-level LLM, or any combination thereof, in an LLM repository. In some examples, the repository component 1060 may be configured to support storing metadata associated with the first intermediate LLM, the user-level LLM, or any combination thereof, the metadata including LLM lineage information, LLM relationship information, LLM version information, access control information, or any combination thereof.

In some examples, the update component 1065 may be configured to support updating the user-level LLM. In some examples, the update component 1065 may be configured to support storing the updated user-level LLM in the LLM repository. In some examples, the update component 1065 may be configured to support updating the metadata associated with the user-level LLM based on the updated user-level LLM.

In some examples, the update component 1065 may be configured to support re-deriving the first intermediate LLM, the user-level LLM, or both, based on one or more changes to the broad spectrum LLM, the first intermediate LLM, or both.

In some examples, the validation component 1070 may be configured to support validating the first intermediate LLM, the user-level LLM, or both.

Figure 11:
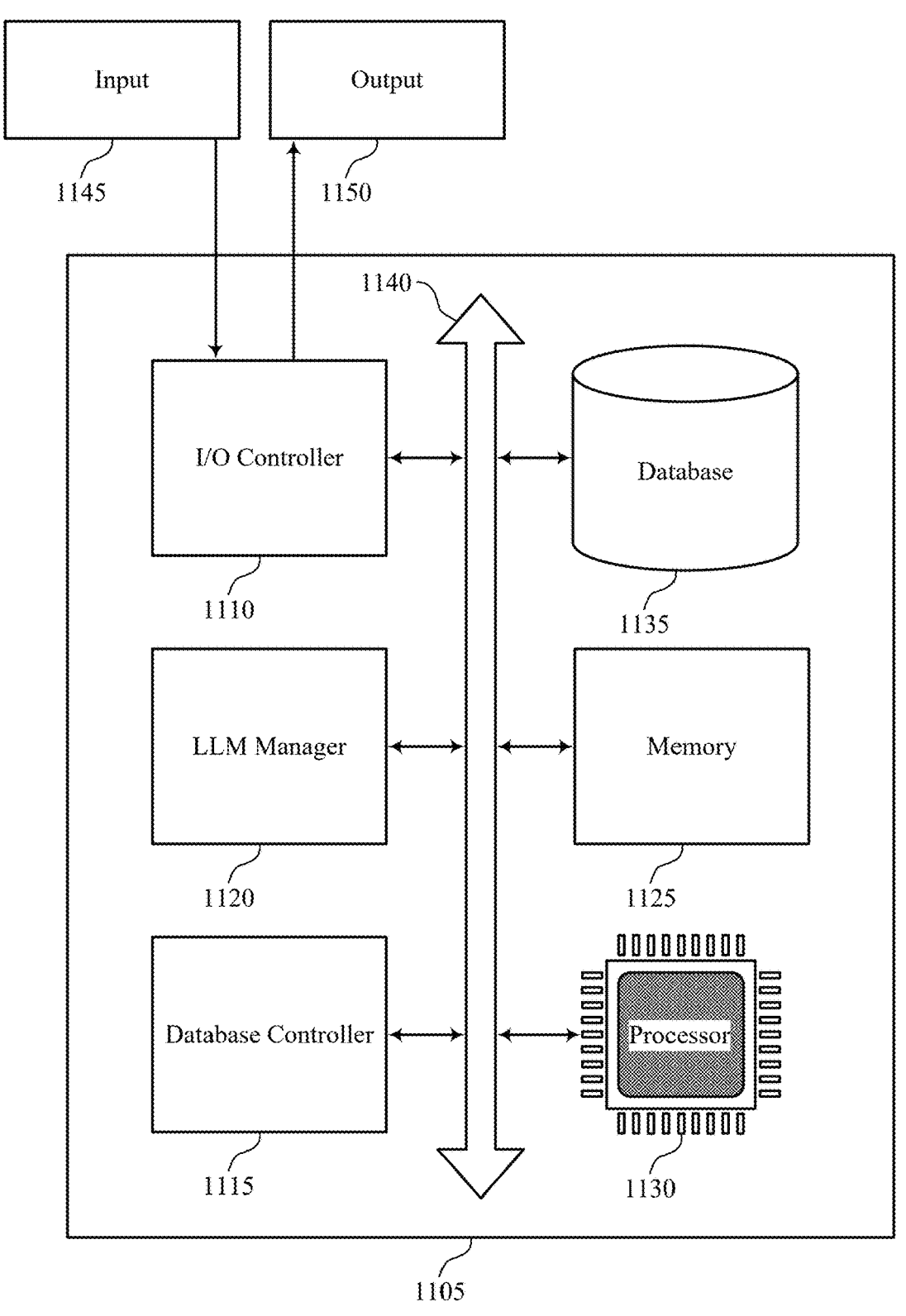
FIG. 11 shows a diagram of a system including a device that supports multi-layered customization framework in accordance with examples as disclosed herein.

FIG. 11 shows a diagram of a system 1100 including a device 1105 that supports multi-layered customization framework in accordance with examples as disclosed herein. The device 1105 may be an example of or include the components of a device 905 as described herein. The device 1105 may include components for bi-directional data communications including components for transmitting and receiving communications, such as an LLM manager 1120, an I/O controller 1110, a database controller 1115, at least one memory 1125, at least one processor 1130, and a database 1135. These components may be in electronic communication or otherwise coupled (e.g., operatively, communicatively, functionally, electronically, electrically) via one or more buses (e.g., a bus 1140).

The I/O controller 1110 may manage input signals 1145 and output signals 1150 for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. In other cases, the I/O controller 1110 may represent or interact with a modem, a keyboard, a mouse, a touchscreen, or a similar device. In some cases, the I/O controller 1110 may be implemented as part of a processor 1130. In some examples, a user may interact with the device 1105 via the I/O controller 1110 or via hardware components controlled by the I/O controller 1110.

The database controller 1115 may manage data storage and processing in a database 1135. In some cases, a user may interact with the database controller 1115. In other cases, the database controller 1115 may operate automatically without user interaction. The database 1135 may be an example of a single database, a distributed database, multiple distributed databases, a data store, a data lake, or an emergency backup database.

Memory 1125 may include random-access memory (RAM) and read-only memory (ROM). The memory 1125 may store computer-readable, computer-executable software including instructions that, when executed, cause at least one processor 1130 to perform various functions described herein. In some cases, the memory 1125 may contain, among other things, a basic I/O system (BIOS) which may control basic hardware or software operation such as the interaction with peripheral components or devices. The memory 1125 may be an example of a single memory or multiple memories. For example, the device 1105 may include one or more memories 1125.

The processor 1130 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 1130 may be configured to operate a memory array using a memory controller. In other cases, a memory controller may be integrated into the processor 1130. The processor 1130 may be configured to execute computer-readable instructions stored in at least one memory 1125 to perform various functions (e.g., functions or tasks supporting multi-layered customization framework). The processor 1130 may be an example of a single processor or multiple processors. For example, the device 1105 may include one or more processors 1130.

The LLM manager 1120 may support generating a user-level large language model (LLM) in accordance with examples as disclosed herein. For example, the LLM manager 1120 may be configured to support deriving a first intermediate LLM based on a broad spectrum LLM, where the first intermediate LLM is associated with a first level of a hierarchy, and where deriving the first intermediate LLM includes training the first intermediate LLM on first training data associated with the first level of the hierarchy. The LLM manager 1120 may be configured to support deriving a user-level LLM based on the first intermediate LLM, where the user-level LLM is associated with a user associated with a second level of the hierarchy included in the first level of the hierarchy, where deriving the user-level LLM includes training the user-level LLM on second training data associated with the user, and where deriving the user-level LLM further includes inheriting one or more first characteristics from the first intermediate LLM.

By including or configuring the LLM manager 1120 in accordance with examples as described herein, the device 1105 may support techniques for improved communication reliability, reduced latency, improved user experience related to reduced processing, reduced power consumption, more efficient utilization of communication resources, improved coordination between devices, longer battery life, improved utilization of processing capability, or any combination thereof.

FIG. 12 shows a flowchart illustrating a method 1200 that supports multi-layered customization framework in accordance with examples as disclosed herein. The operations of the method 1200 may be implemented by an application server or its components as described herein. For example, the operations of the method 1200 may be performed by an application server as described with reference to FIGS. 1 through 11. In some examples, an application server may execute a set of instructions to control the functional elements of the application server to perform the described functions. Additionally, or alternatively, the application server may perform aspects of the described functions using special-purpose hardware.

At 1205, the method may include deriving a first intermediate LLM based on a broad spectrum LLM, where the first intermediate LLM is associated with a first level of a hierarchy, and where deriving the first intermediate LLM includes training the first intermediate LLM on first training data associated with the first level of the hierarchy. The operations of block 1205 may be performed in accordance with examples as disclosed herein. In some examples, aspects of the operations of 1205 may be performed by an intermediate derivation component 1025 as described with reference to FIG. 10.

At 1210, the method may include deriving a user-level LLM based on the first intermediate LLM, where the user-level LLM is associated with a user associated with a second level of the hierarchy included in the first level of the hierarchy, where deriving the user-level LLM includes training the user-level LLM on second training data associated with the user, and where deriving the user-level LLM further includes inheriting one or more first characteristics from the first intermediate LLM. The operations of block 1210 may be performed in accordance with examples as disclosed herein. In some examples, aspects of the operations of 1210 may be performed by a user-level derivation component 1030 as described with reference to FIG. 10.

FIG. 13 shows a flowchart illustrating a method 1300 that supports multi-layered customization framework in accordance with examples as disclosed herein. The operations of the method 1300 may be implemented by an application server or its components as described herein. For example, the operations of the method 1300 may be performed by an application server as described with reference to FIGS. 1 through 11. In some examples, an application server may execute a set of instructions to control the functional elements of the application server to perform the described functions. Additionally, or alternatively, the application server may perform aspects of the described functions using special-purpose hardware.

At 1305, the method may include deriving a first intermediate LLM based on a broad spectrum LLM, where the first intermediate LLM is associated with a first level of a hierarchy, and where deriving the first intermediate LLM includes training the first intermediate LLM on first training data associated with the first level of the hierarchy. The operations of block 1305 may be performed in accordance with examples as disclosed herein. In some examples, aspects of the operations of 1305 may be performed by an intermediate derivation component 1025 as described with reference to FIG. 10.

At 1310, the method may include deriving a second intermediate LLM based on the first intermediate LLM, where the second intermediate LLM is associated with a third level of the hierarchy, where deriving the second intermediate LLM includes inheriting one or more second characteristics from the first intermediate LLM. The operations of block 1310 may be performed in accordance with examples as disclosed herein. In some examples, aspects of the operations of 1310 may be performed by an intermediate derivation component 1025 as described with reference to FIG. 10, an inheritance component 1040 as described with reference to FIG. 10, or both.

At 1315, the method may include deriving a user-level LLM based on the first intermediate LLM, where the user-level LLM is associated with a user associated with a second level of the hierarchy included in the first level of the hierarchy, where deriving the user-level LLM includes training the user-level LLM on second training data associated with the user, and where deriving the user-level LLM further includes inheriting one or more first characteristics from the first intermediate LLM, and where deriving the user-level LLM includes deriving the user-level LLM based on the second intermediate LLM and inheriting one or more third characteristics from the second intermediate LLM. The operations of block 1315 may be performed in accordance with examples as disclosed herein. In some examples, aspects of the operations of 1315 may be performed by a user-level derivation component 1030 as described with reference to FIG. 10.

A method for generating a user-level large language model (LLM) by an apparatus is described. The method may include deriving a first intermediate LLM based on a broad spectrum LLM, where the first intermediate LLM is associated with a first level of a hierarchy, and where deriving the first intermediate LLM includes training the first intermediate LLM on first training data associated with the first level of the hierarchy and deriving a user-level LLM based on the first intermediate LLM, where the user-level LLM is associated with a user associated with a second level of the hierarchy included in the first level of the hierarchy, where deriving the user-level LLM includes training the user-level LLM on second training data associated with the user, and where deriving the user-level LLM further includes inheriting one or more first characteristics from the first intermediate LLM.

An apparatus for generating a user-level large language model (LLM) is described. The apparatus may include one or more memories storing processor executable code, and one or more processors coupled with the one or more memories. The one or more processors may individually or collectively operable to execute the code to cause the apparatus to derive a first intermediate LLM based on a broad spectrum LLM, where the first intermediate LLM is associated with a first level of a hierarchy, and where deriving the first intermediate LLM includes training the first intermediate LLM on first training data associated with the first level of the hierarchy and derive a user-level LLM based on the first intermediate LLM, where the user-level LLM is associated with a user associated with a second level of the hierarchy included in the first level of the hierarchy, where deriving the user-level LLM includes training the user-level LLM on second training data associated with the user, and where deriving the user-level LLM further includes inheriting one or more first characteristics from the first intermediate LLM.

Another apparatus for generating a user-level large language model (LLM) is described. The apparatus may include means for deriving a first intermediate LLM based on a broad spectrum LLM, where the first intermediate LLM is associated with a first level of a hierarchy, and where deriving the first intermediate LLM includes training the first intermediate LLM on first training data associated with the first level of the hierarchy and means for deriving a user-level LLM based on the first intermediate LLM, where the user-level LLM is associated with a user associated with a second level of the hierarchy included in the first level of the hierarchy, where deriving the user-level LLM includes training the user-level LLM on second training data associated with the user, and where deriving the user-level LLM further includes inheriting one or more first characteristics from the first intermediate LLM.

A non-transitory computer-readable medium storing code for generating a user-level large language model (LLM) is described. The code may include instructions executable by a processor to derive a first intermediate LLM based on a broad spectrum LLM, where the first intermediate LLM is associated with a first level of a hierarchy, and where deriving the first intermediate LLM includes training the first intermediate LLM on first training data associated with the first level of the hierarchy and derive a user-level LLM based on the first intermediate LLM, where the user-level LLM is associated with a user associated with a second level of the hierarchy included in the first level of the hierarchy, where deriving the user-level LLM includes training the user-level LLM on second training data associated with the user, and where deriving the user-level LLM further includes inheriting one or more first characteristics from the first intermediate LLM.

In some examples of the method, apparatus, and non-transitory computer-readable medium described herein, the broad spectrum LLM may be a general-purpose LLM trained on data unassociated with the hierarchy and training the first intermediate LLM includes training the first intermediate LLM on data associated with a set of multiple tenants of a multi-tenant system, where the first level of the hierarchy may be associated with the multi-tenant system.

Some examples of the method, apparatus, and non-transitory computer-readable medium described herein may further include operations, features, means, or instructions for deriving a second intermediate LLM based on the first intermediate LLM, where the second intermediate LLM may be associated with a third level of the hierarchy, where deriving the second intermediate LLM includes inheriting one or more second characteristics from the first intermediate LLM, and where deriving the user-level LLM includes deriving the user-level LLM based on the second intermediate LLM and inheriting one or more third characteristics from the second intermediate LLM.

Some examples of the method, apparatus, and non-transitory computer-readable medium described herein may further include operations, features, means, or instructions for receiving user input indicating one or more user preferences associated with the user, where deriving the user-level LLM may be based on the one or more user preferences.

In some examples of the method, apparatus, and non-transitory computer-readable medium described herein, the one or more first characteristics include policy information, governance information, customization preferences, legal information, access control information, or any combination thereof.

In some examples of the method, apparatus, and non-transitory computer-readable medium described herein, the first training data, the second training data, or any combination thereof includes domain knowledge associated with a role of the user, tone of voice information, style guide information, brand messaging information, product documentation, governance data, preference information, or any combination thereof.

Some examples of the method, apparatus, and non-transitory computer-readable medium described herein may further include operations, features, means, or instructions for storing the first intermediate LLM, the user-level LLM, or any combination thereof, in an LLM repository and storing metadata associated with the first intermediate LLM, the user-level LLM, or any combination thereof, the metadata including LLM lineage information, LLM relationship information, LLM version information, access control information, or any combination thereof.

Some examples of the method, apparatus, and non-transitory computer-readable medium described herein may further include operations, features, means, or instructions for updating the user-level LLM, storing the updated user-level LLM in the LLM repository, and updating the metadata associated with the user-level LLM based on the updated user-level LLM.

Some examples of the method, apparatus, and non-transitory computer-readable medium described herein may further include operations, features, means, or instructions for re-deriving the first intermediate LLM, the user-level LLM, or both, based on one or more changes to the broad spectrum LLM, the first intermediate LLM, or both.

Some examples of the method, apparatus, and non-transitory computer-readable medium described herein may further include operations, features, means, or instructions for validating the first intermediate LLM, the user-level LLM, or both.

The following provides an overview of aspects of the present disclosure:

Aspect 1: A method for generating a user-level large language model (LLM), comprising: deriving a first intermediate LLM based at least in part on a broad spectrum LLM, wherein the first intermediate LLM is associated with a first level of a hierarchy, and wherein deriving the first intermediate LLM comprises training the first intermediate LLM on first training data associated with the first level of the hierarchy; and deriving a user-level LLM based at least in part on the first intermediate LLM, wherein the user-level LLM is associated with a user associated with a second level of the hierarchy comprised in the first level of the hierarchy, wherein deriving the user-level LLM comprises training the user-level LLM on second training data associated with the user, and wherein deriving the user-level LLM further comprises inheriting one or more first characteristics from the first intermediate LLM.

Aspect 2: The method of aspect 1, wherein the broad spectrum LLM is a general-purpose LLM trained on data unassociated with the hierarchy; and training the first intermediate LLM comprises training the first intermediate LLM on data associated with a plurality of tenants of a multi-tenant system, wherein the first level of the hierarchy is associated with the multi-tenant system.

Aspect 3: The method of any of aspects 1 through 2, further comprising: deriving a second intermediate LLM based at least in part on the first intermediate LLM, wherein the second intermediate LLM is associated with a third level of the hierarchy; wherein deriving the second intermediate LLM comprises inheriting one or more second characteristics from the first intermediate LLM; and wherein deriving the user-level LLM comprises deriving the user-level LLM based at least in part on the second intermediate LLM and inheriting one or more third characteristics from the second intermediate LLM.

Aspect 4: The method of any of aspects 1 through 3, further comprising: receiving user input indicating one or more user preferences associated with the user, wherein deriving the user-level LLM is based at least in part on the one or more user preferences.

Aspect 5: The method of any of aspects 1 through 4, wherein the one or more first characteristics comprise policy information, governance information, customization preferences, legal information, access control information, or any combination thereof.

Aspect 6: The method of any of aspects 1 through 5, wherein the first training data, the second training data, or any combination thereof comprises domain knowledge associated with a role of the user, tone of voice information, style guide information, brand messaging information, product documentation, governance data, preference information, or any combination thereof.

Aspect 7: The method of any of aspects 1 through 6, further comprising: storing the first intermediate LLM, the user-level LLM, or any combination thereof, in an LLM repository; and storing metadata associated with the first intermediate LLM, the user-level LLM, or any combination thereof, the metadata comprising LLM lineage information, LLM relationship information, LLM version information, access control information, or any combination thereof.

Aspect 8: The method of aspect 7, further comprising: updating the user-level LLM; storing the updated user-level LLM in the LLM repository; and updating the metadata associated with the user-level LLM based at least in part on the updated user-level LLM.

Aspect 9: The method of any of aspects 1 through 8, further comprising: re-deriving the first intermediate LLM, the user-level LLM, or both, based at least in part on one or more changes to the broad spectrum LLM, the first intermediate LLM, or both.

Aspect 10: The method of any of aspects 1 through 9, further comprising: validating the first intermediate LLM, the user-level LLM, or both.

Aspect 11: An apparatus for generating a user-level large language model (LLM), comprising one or more memories storing processor-executable code, and one or more processors coupled with the one or more memories and individually or collectively operable to execute the code to cause the apparatus to perform a method of any of aspects 1 through 10.

Aspect 12: An apparatus for generating a user-level large language model (LLM), comprising at least one means for performing a method of any of aspects 1 through 10.

Aspect 13: A non-transitory computer-readable medium storing code for generating a user-level large language model (LLM), the code comprising instructions executable by a processor to perform a method of any of aspects 1 through 10.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for generating a user-level large language model (LLM), comprising:

deriving a first intermediate LLM based at least in part on a broad spectrum LLM, wherein the first intermediate LLM is associated with a first level of a hierarchy, and wherein deriving the first intermediate LLM comprises training the first intermediate LLM on first training data associated with the first level of the hierarchy;

storing the first intermediate LLM and metadata associated with the first intermediate LLM in an LLM repository;

deriving a user-level LLM based at least in part on the first intermediate LLM and the metadata associated with the first intermediate LLM, wherein the user-level LLM is associated with a user associated with a second level of the hierarchy comprised in the first level of the hierarchy, wherein deriving the user-level LLM comprises training the user-level LLM on second training data associated with the user, and wherein deriving the user-level LLM further comprises inheriting one or more first characteristics from the first intermediate LLM;

deriving a second user-level LLM based at least in part on the stored first intermediate LLM and the metadata associated with the first intermediate LLM; and validating the first intermediate LLM, the user-level LLM, and the second user-level LLM for compliance with policy information and governance information corresponding to the hierarchy.

2. The method of claim 1, wherein:

the broad spectrum LLM is a general-purpose LLM trained on data unassociated with the hierarchy; and training the first intermediate LLM comprises training the first intermediate LLM on data associated with a plurality of tenants of a multi-tenant system, wherein the first level of the hierarchy is associated with the multi-tenant system.

3. The method of claim 1, further comprising:

deriving a second intermediate LLM based at least in part on the first intermediate LLM, wherein the second intermediate LLM is associated with a third level of the hierarchy;

wherein deriving the second intermediate LLM comprises inheriting one or more second characteristics from the first intermediate LLM; and wherein deriving the user-level LLM comprises deriving the user-level LLM based at least in part on the second intermediate LLM and inheriting one or more third characteristics from the second intermediate LLM.

4. The method of claim 1, further comprising:

receiving user input indicating one or more user preferences associated with the user, wherein deriving the user-level LLM is based at least in part on the one or more user preferences.

5. The method of claim 1, wherein the one or more first characteristics comprise the policy information, the governance information, customization preferences, legal information, access control information, or any combination thereof.

6. The method of claim 1, wherein the first training data, the second training data, or any combination thereof comprises domain knowledge associated with a role of the user, tone of voice information, style guide information, brand messaging information, product documentation, the governance information, preference information, or any combination thereof.

7. The method of claim 1, further comprising:

storing the user-level LLM in the LLM repository; and storing second metadata associated with the user-level LLM wherein the metadata, the second metadata, or both, comprise LLM lineage information, LLM relationship information, LLM version information, access control information, or any combination thereof.

8. The method of claim 7, further comprising:

updating the user-level LLM;

storing the updated user-level LLM in the LLM repository; and updating the metadata associated with the user-level LLM based at least in part on the updated user-level LLM.

9. The method of claim 1, further comprising:

re-deriving the first intermediate LLM, the user-level LLM, or both, based at least in part on one or more changes to the broad spectrum LLM, the first intermediate LLM, or both.

10. An apparatus for generating a user-level large language model (LLM), comprising:

one or more memories storing processor-executable code; and one or more processors coupled with the one or more memories and individually or collectively operable to execute the code to cause the apparatus to:

derive a first intermediate LLM based at least in part on a broad spectrum LLM, wherein the first intermediate LLM is associated with a first level of a hierarchy, and wherein deriving the first intermediate LLM comprises training the first intermediate LLM on first training data associated with the first level of the hierarchy;

store the first intermediate LLM and metadata associated with the first intermediate LLM in an LLM repository;

derive a user-level LLM based at least in part on the first intermediate LLM and the metadata associated with the first intermediate LLM, wherein the user-level LLM is associated with a user associated with a second level of the hierarchy comprised in the first level of the hierarchy, wherein deriving the user-level LLM comprises training the user-level LLM on second training data associated with the user, and wherein deriving the user-level LLM further comprises inheriting one or more first characteristics from the first intermediate LLM;

derive a second user-level LLM based at least in part on the stored first intermediate LLM and the metadata associated with the first intermediate LLM; and validate the first intermediate LLM, the user-level LLM, and the second user-level LLM for compliance with policy information and governance information corresponding to the hierarchy.

11. The apparatus of claim 10, wherein:

the broad spectrum LLM is a general-purpose LLM trained on data unassociated with the hierarchy; and training the first intermediate LLM comprises training the first intermediate LLM on data associated with a plurality of tenants of a multi-tenant system, wherein the first level of the hierarchy is associated with the multi-tenant system.

12. The apparatus of claim 10, wherein the one or more processors are individually or collectively further operable to execute the code to cause the apparatus to:

derive a second intermediate LLM based at least in part on the first intermediate LLM, wherein the second intermediate LLM is associated with a third level of the hierarchy;

wherein the derivation of the second intermediate LLM comprises inheriting one or more second characteristics from the first intermediate LLM; and wherein the derivation of the user-level LLM comprises deriving the user-level LLM based at least in part on the second intermediate LLM and inheriting one or more third characteristics from the second intermediate LLM.

13. The apparatus of claim 10, wherein the one or more processors are individually or collectively further operable to execute the code to cause the apparatus to:

receive user input indicating one or more user preferences associated with the user, wherein deriving the user-level LLM is based at least in part on the one or more user preferences.

14. The apparatus of claim 10, wherein the one or more first characteristics comprise the policy information, the governance information, customization preferences, legal information, access control information, or any combination thereof.

15. The apparatus of claim 10, wherein the first training data, the second training data, or any combination thereof comprises domain knowledge associated with a role of the user, tone of voice information, style guide information, brand messaging information, product documentation, the governance information, preference information, or any combination thereof.

16. The apparatus of claim 10, wherein the one or more processors are individually or collectively further operable to execute the code to cause the apparatus to:

store the user-level LLM in the LLM repository; and store second metadata associated with the user-level LLM wherein the metadata, the second metadata, or both, comprise LLM lineage information, LLM relationship information, LLM version information, access control information, or any combination thereof.

17. The apparatus of claim 16, wherein the one or more processors are individually or collectively further operable to execute the code to cause the apparatus to:

update the user-level LLM;

store the updated user-level LLM in the LLM repository; and update the metadata associated with the user-level LLM based at least in part on the updated user-level LLM.

18. A non-transitory computer-readable medium storing code for generating a user-level large language model (LLM), the code comprising instructions executable by one or more processors to:

derive a first intermediate LLM based at least in part on a broad spectrum LLM, wherein the first intermediate LLM is associated with a first level of a hierarchy, and wherein deriving the first intermediate LLM comprises training the first intermediate LLM on first training data associated with the first level of the hierarchy;

store the first intermediate LLM and metadata associated with the first intermediate LLM in an LLM repository;

derive a user-level LLM based at least in part on the first intermediate LLM and the metadata associated with the first intermediate LLM, wherein the user-level LLM is associated with a user associated with a second level of the hierarchy comprised in the first level of the hierarchy, wherein deriving the user-level LLM comprises training the user-level LLM on second training data associated with the user, and wherein deriving the user-level LLM further comprises inheriting one or more first characteristics from the first intermediate LLM;

derive a second user-level LLM based at least in part on the stored first intermediate LLM and the metadata associated with the first intermediate LLM; and validate the first intermediate LLM, the user-level LLM, and the second user-level LLM for compliance with policy information and governance information corresponding to the hierarchy.

\* \* \* \* \*